(12) United States Patent
Ikenishi et al.

(10) Patent No.: US 8,222,170 B2
(45) Date of Patent: *Jul. 17, 2012

(54) GLASS SUBSTRATE FOR INFORMATION RECORDING MEDIUM AND MAGNETIC INFORMATION RECORDING MEDIUM TO WHICH THE GLASS SUBSTRATE IS APPLIED

(75) Inventors: Mikio Ikenishi, Tokyo (JP); Atsuko Morita, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,512

(22) Filed: Feb. 1, 2010

(65) Prior Publication Data

US 2010/0160141 A1 Jun. 24, 2010

Related U.S. Application Data

(60) Continuation of application No. 12/385,778, filed on Apr. 20, 2009, now abandoned, which is a continuation of application No. 11/434,147, filed on May 16, 2006, now abandoned, which is a division of application No. 10/810,896, filed on Mar. 29, 2004, now Pat. No. 7,090,937, which is a division of application No. 10/156,659, filed on May 29, 2002, now Pat. No. 6,818,576.

(30) Foreign Application Priority Data

May 31, 2001 (JP) ................................ 2001-165226

(51) Int. Cl.
- C03C 3/085 (2006.01)
- C03C 3/091 (2006.01)
- G11B 7/241 (2006.01)

(52) U.S. Cl. .................. 501/69; 501/66; 501/67; 501/70
(58) Field of Classification Search .............. 501/65–70; 428/846.9

See application file for complete search history.

(56) References Cited

U.S. PATENT DOCUMENTS

| | | | |
|---|---|---|---|
| 3,615,320 A | 10/1971 | Junge et al. | |
| 3,959,000 A | 5/1976 | Nakagawa et al. | |
| 4,156,755 A | 5/1979 | Rinehart | |
| 5,391,522 A | 2/1995 | Goto et al. | |
| 5,674,790 A | 10/1997 | Araujo | |
| 5,972,460 A | 10/1999 | Tachiwana | |
| 5,997,977 A | 12/1999 | Zou et al. | |
| 6,040,029 A | 3/2000 | Yamamoto et al. | |
| 6,063,470 A | 5/2000 | Zou et al. | |
| 6,162,751 A | 12/2000 | Speit et al. | |
| 6,184,162 B1 | 2/2001 | Speit et al. | |
| 6,187,407 B1 | 2/2001 | Zou et al. | |
| 6,187,441 B1 | 2/2001 | Takeuchi et al. | |
| 6,294,490 B1 | 9/2001 | Zou et al. | |
| 6,332,338 B1 | 12/2001 | Hashimoto et al. | |
| 6,347,016 B1 | 2/2002 | Ishida et al. | |
| 6,376,402 B1 | 4/2002 | Pannhorst et al. | |
| 6,376,403 B1 | 4/2002 | Koyama et al. | |
| 6,387,510 B1 | 5/2002 | Nakashima et al. | |
| 6,399,527 B1 | 6/2002 | Kishimoto et al. | |
| 6,436,859 B1 | 8/2002 | Muramoto et al. | |
| 6,440,531 B1 | 8/2002 | Kurachi et al. | |
| 6,475,599 B1 | 11/2002 | Saito et al. | |
| 6,577,472 B2 | 6/2003 | Yamamoto et al. | |
| 6,627,565 B1 | 9/2003 | Zou et al. | |
| 6,627,566 B1 | 9/2003 | Zou | |
| 6,818,576 B2 | 11/2004 | Ikenishi et al. | |
| 6,819,526 B2 | 11/2004 | Kataoka et al. | |
| 7,090,937 B2 | 8/2006 | Ikenishi et al. | |
| 2002/0055017 A1 | 5/2002 | Fukushima et al. | |

FOREIGN PATENT DOCUMENTS

| | | | |
|---|---|---|---|
| EP | 0953548 | | 3/1999 |
| JP | 63-062970 | | 3/1988 |
| JP | 1-239036 | | 9/1989 |
| JP | 5-32431 | | 2/1993 |
| JP | 6-76224 | | 9/1994 |
| JP | 08-319752 | | 11/1996 |
| JP | H9-52729 | | 2/1997 |
| JP | 10001329 | * | 1/1998 |
| JP | 10-40544 | | 2/1998 |
| JP | 10-158028 | | 6/1998 |
| JP | 10-241134 | | 9/1998 |
| JP | 11-171597 | | 6/1999 |
| JP | 11-191212 | | 7/1999 |
| JP | 11-199267 | | 7/1999 |

(Continued)

OTHER PUBLICATIONS

Translation of Japan Patent Publication 09-052729, Feb. 1997.
Mechanical Properties of Ceramics, published by the Incorporated body, Ceramics Society, 1979, pp. 5-7 w/English translation.
Glass Technology Hand Book, Masayuki Yamane et al, published by Asakura Shoten, 1999, p. 83 . . . ibid, with English translation.
Glass Cyclopedia, published by Asakura Shoten, 1985, pp. 342-345, 350-353 and 366-369 . . . ibid, with English translation.

(Continued)

Primary Examiner — Karl Group
(74) Attorney, Agent, or Firm — Nixon & Vanderhye P.C.

(57) ABSTRACT

Disclosed are a glass substrate for an information recording medium, having excellent scratch resistance and a light weight and having high fracture toughness, the glass substrate having a fragility index value, measured in water, of 12 $\mu m^{-1/2}$ or less or having a fragility index value, measured in an atmosphere having a dew point of $-5°$ C. or lower, of 7 $\mu m^{-1/2}$ or less, or the glass substrate comprising, by mol %, 40 to 75% of $SiO_2$, 2 to 45% of $B_2O_3$ and/or $Al_2O_3$ and 0 to 40% of $R'_2O$ in which R' is at least one member selected from the group consisting of Li, Na and K), wherein the total content of $SiO_2$, $B_2O_3$, $Al_2O_3$ and $R'_2O$ is at least 90 mol %, and a magnetic information recording medium comprising a magnetic recording layer formed on the glass substrate.

11 Claims, No Drawings

| | FOREIGN PATENT DOCUMENTS | | |
|---|---|---|---|
| JP | 11199267 | * | 7/1999 |
| JP | 11314931 | * | 11/1999 |
| JP | 2000007372 | * | 1/2000 |
| JP | 2000143282 | * | 5/2000 |
| JP | 2000-159540 | | 6/2000 |
| JP | 200203872 | * | 7/2000 |
| JP | 2000-322731 | | 11/2000 |
| JP | 2000-351649 | | 12/2000 |
| JP | 2001-19466 | | 1/2001 |
| JP | 2001-76336 | | 3/2001 |
| JP | 2000-63144 | | 2/2002 |
| WO | WO 98/09922 | | 3/1998 |

OTHER PUBLICATIONS

New Glass vol. 8 No. 4, 1993 "Glass Media for High Density Magnetic Recording", pp. 242-247 . . . ibid, with English translation.

Sehgal et al, "Brittleness of Glass", Journal of Non-Crystalline Solids, 253 (1999) 126-132.

Photograph of Appearance of Magnetic Disk Drive.

Home page f Hard Disk Drives.

* cited by examiner

GLASS SUBSTRATE FOR INFORMATION RECORDING MEDIUM AND MAGNETIC INFORMATION RECORDING MEDIUM TO WHICH THE GLASS SUBSTRATE IS APPLIED

CROSS-REFERENCE TO RELATED APPLICATION

This application is a continuation of application Ser. No. 12/385,778 filed Apr. 20, 2009, now abandoned, which in turn is a continuation of application Ser. No. 11/434,147 filed May 16, 2006, now abandoned, which in turn is a divisional of application Ser. No. 10/810,896 filed Mar. 29, 2004, now U.S. Pat. No. 7,090,937, which in turn is a divisional of application Ser. No. 10/156,659 filed May 29, 2002, now U.S. Pat. No. 6,818,576, which claims priority of JP 2001-165226 filed May 31, 2001, the entire content of which is hereby incorporated by reference in this application.

BACKGROUND OF THE INVENTION

1. Field of the Invention

The present invention relates to a glass substrate for an information recording medium and a magnetic information recording medium to which the glass substrate is applied. More specifically, the present invention relates to a glass substrate for an information recording medium, which glass substrate is excellent in scratch resistance and light in weight and has high fracture toughness, and a magnetic information recording medium to which the above glass substrate is applied, which medium is typified by a hard disk drive.

2. Prior Art of the Invention

Conventionally, aluminum, glass, ceramic, or the like is used as a substrate material for a magnetic information recording medium. At present, aluminum and glass are mainly practically used depending upon a size and use. Of these, a glass substrate has no or few surface defects and is excellent in smoothness and surface hardness, so that the extent to which it is used is expanding year after year. As a glass for use as a substrate for a magnetic information recording medium, a chemically strengthened glass according to an ion-exchange method, a glass ceramic, etc., are known. As a chemically strengthened glass, for example, JP-A-1-239036 discloses a chemically strengthened glass substrate for a magnetic disk, which substrate is formed of a glass containing, by weight %, 50 to 65% of $SiO_2$, 0.5 to 14% of $Al_2O_3$, 10 to 32% of $R_2O$ (in which R is an alkali metal ion), 1 to 15% of ZnO and 1.1 to 14% of $B_2O_3$ and having a compressive stress layer formed in the surface thereof by an ion-exchange method. Further, as a crystallized glass, for example, U.S. Pat. No. 5,391,522 discloses a glass ceramic substrate for a magnetic disk, which glass ceramic substrate contains, by weight %, 65 to 83% of $SiO_2$, 8 to 13% of $Li_2O$, 0 to 7% of $K_2O$, 0.5 to 5% of MgO, 0 to 5% of ZnO, 0 to 5% of PbO, provided that MgO+ZnO+PbO=0.5 to 5%, 1 to 4% of $P_2O_5$, 0 to 7% of $Al_2O_3$ and 0 to 2% of $As_2O_3+Sb_2O_3$, the above glass ceramic substrate containing fine $Li_2O.2SiO_2$ as a main crystal.

In recent years, however, an information recording device such as a magnetic disk drive typified by a hard disk drive is demanded to satisfy a higher recording density and a higher speed of writing and reading data, so that it is required to increase the rotation of a disk. The rotation of a disk is approximately 7,200 rpm at present, and it is expected that the rotation will be 15,000 rpm or larger in the future. In particular, a hard disk drive for a server for processing a large volume of data will be particularly increasingly required to satisfy such a demand. With an increase in the rotation of a recording medium, however, the recording medium is caused to bend and a resonance grows, so that there is increased a risk that the surface of the recording medium collides with a magnetic head to cause a read error or to cause clashing of the magnetic head. In an existing recording medium, therefore, it is difficult to decrease a distance (flying height) between the magnetic head and the recording medium beyond a certain value, so that the above risk is constituting a factor that inhibits an increase in the recording density of a magnetic recording device. The above bending-resonance problem of the recording medium can be overcome by employing a substrate material having a high elastic coefficient.

However, a conventional aluminum substrate has an elastic coefficient of approximately 72 GPa, and a glass substrate has an elastic coefficient of approximately 80 to 100 GPa, so that these substrates cannot comply with an increase in the rotation. There is therefore a trend toward increasing the thickness of a substrate to comply with an increase in the rotation. An increase in the thickness of a substrate involves an increase in weight, so that the power consumption for an increase in the rotation increases. Substrate materials having a smaller weight than an aluminum alloy having a large density (2.76 $g/cm^3$) are commercially demanded. Further, since an aluminum substrate has a far lower surface hardness than a glass substrate and is therefore liable to undergo plastic deformation, so that the surface of a recording medium may be dented due to a collision between a high-speed revolving substrate and a magnetic head. A glass substrate is excellent over an aluminum substrate in all of elastic coefficient, surface hardness and surface smoothness. However, the glass substrate is more fragile than the aluminum substrate, and a slight scratch formed during its production steps leads to breakage of the glass substrate. For example, when a glass is used for a magnetic disk substrate, the formation of the magnetic disk requires many working processes such as processing to form a circular form, making of a center hole and processing of surfaces of inner and outer circumferences. During the above processing steps, many scratches that can be start points of fractures occur in a glass edge portion, etc., and slight scratches that are formed not only during the production step but also during handlings such as mounting of the glass to a spindle, etc., may lead to the breakage of the substrate. The above problem gains an importance with an increase in the rotation of a magnetic disk. For overcoming these problems, it comes to be required to provide a substrate glass having a small density and having little or no susceptibility to scratches or a substrate glass having high resistance to progress of glass fracture, that is, high fracture toughness.

SUMMARY OF THE INVENTION

Under the circumstances, it is an object of the present invention to provide a glass substrate for an information recording medium, which has a small density and has excellent scratch resistance so that it is little or not at all susceptible to scratches, and further, which has high resistance against progress of fracture, that is, high fracture toughness, as well as a magnetic information recording medium to which the above glass substrate is applied.

For achieving the above object, the present inventors have made diligent studies and as a result have found that a glass substrate having a fragility index value, measured in water and/or a dry atmosphere, of a certain value or smaller or a glass substrate having a specific glass composition can suit the above object as a glass substrate for an information recording medium, and the present invention has been accordingly completed on the basis of the above findings.

That is, the present invention provides:

(1) a glass substrate for an information recording medium, having a fragility index value, measured in water, of 12 $\mu m^{-1/2}$ or less (to be referred to as "glass substrate I for an information recording medium" hereinafter), (2) a glass substrate for an information recording medium, having a fragility index value, measured in an atmosphere having a dew point of −5° C. or lower, of 7 $\mu m^{-1/2}$ or less (to be referred to as "glass substrate II for an information recording medium" hereinafter), (3) a glass substrate for an information recording medium, having a fragility index value, measured in water, of 12 $\mu m^{-1/2}$ or less and having a fragility index value, measured in an atmosphere having a dew point of −5° C. or lower, of 7 $\mu m^{-1/2}$ or less (to be referred to as "glass substrate III for an information recording medium" hereinafter), (4) a glass substrate for an information recording medium as recited in the above (1), (2) or (3), comprising, by mol %, greater than 65%, as a total, of $SiO_2$ and at least one of $B_2O_3$ and $Al_2O_3$, 0 to 20% of RO in which R is at least one member selected from the group consisting of Ma, Ca, Zn, Sr and Ba, 0 to 28% of $R'_2O$ in which R' is at least one member selected from the group consisting of Li, Na and K, 0 to 10% of $TiO_2$ and 0 to 10% of $ZrO_2$, the total content of said components being at least 95 mol %, (5) a glass substrate for an information recording medium, comprising, by mol %, 40 to 75% of $SiO_2$, 2 to 45% of $B_2O_3$ and/or $Al_2O_3$ and 0 to 40% of $R'_2O$ in which R' is at least one member selected from the group consisting of Li, Na and K), wherein the total content of $SiO_2$, $B_2O_3$, $Al_2O_3$ and $R'_2O$ is at least 90 mol % (to be referred to as "glass substrate IV for an information recording medium" hereinafter), (6) a glass substrate for an information recording medium as recited in the above (5), having a fragility index value, measured in water, of 12 $\mu m^{-1/2}$ or less.

(7) a glass substrate for an information recording medium as recited in the above (5) or (6), having a fragility index value, measured in an atmosphere having a dew point of −5° C. or lower, of 7 $\mu m^{-1/2}$ less, (8) a glass substrate for an information recording medium as recited in any one of the above (1) to (7), having a Young's modulus of at least 70 GPa, (9) a glass substrate for an information recording medium as recited in any one of the above (1) to (8), having a modulus of rigidity of at least 20 GPa,

(10) a glass substrate for an information recording medium as recited in any one of the above (1) to (9), which is made of a glass having a region wherein the glass has a viscosity of at least 1 Pa·s, in a range of temperatures equivalent to, and higher than, a liquidus temperature of the glass,

(11) a glass substrate for an information recording medium as recited in any one of the above (1) to (10), which is made of a glass having a thermal expansion coefficient of $60 \times 10^{-7}$/° C. or greater at a temperature of from 100° C. to 300° C.,

(12) a glass substrate for an information recording medium as recited in any one of the above (1) to (11), which has no chemically strengthened layer,

(13) a glass substrate for an information recording medium as recited in any one of the above (1) to (11), which has a chemically strengthened layer, and

(14) a magnetic information recording medium comprising a magnetic recording layer formed on the glass substrate for an information recording medium recited in any one of the above (1) to (13).

PREFERRED EMBODIMENTS OF THE INVENTION

The glass substrate for an information recording medium, provided by the present invention, includes four embodiments, that is, glass substrates I to IV for an information recording medium.

The glass substrate I for an information recording medium, provided by the present invention, is a glass substrate having a fragility index value, measured in water, of 12 $\mu m^{-1/2}$ or less. With a decrease in the fragility index value in water, the glass substrate comes to be less fragile. The fragility index value in water is preferably 10.5 $\mu m^{-1/2}$ or less, more preferably 9 $\mu m^{-1/2}$ or less, still more preferably 8 $\mu m^{-1/2}$ or less. When the fragility index value of the glass substrate in water is of the above value, the glass substrate is free from fracture during its polishing in a state where the glass substrate is soaked in a polishing liquid, or during its handling in a state where it is wet with a polishing liquid or a washing liquid.

The glass substrate II for an information recording medium, provided by the present invention, is a glass substrate having a fragility index value, measured in an atmosphere having a dew point of −5° C. or lower, of 7 $\mu m^{-1/2}$ or less. The above fragility index value is preferably 6 $\mu m^{-1/2}$ or less, more preferably 5 $\mu m^{-1/2}$ or less, still more preferably 4 $\mu m^{-1/2}$ or less. When the fragility index value in an atmosphere having a dew point of −5° C. or lower, that is, in a dry atmosphere, is of the above value, the glass substrate is free from fracture during its handling in a dry atmosphere or during the use of an information recording medium to which the glass substrate is applied.

The glass substrate III for an information recording medium, provided by the present invention, is a glass substrate having a fragility index value, measured in water, of 12 $\mu m^{-1/2}$ or less and having a fragility index value, measured in an atmosphere having a dew point of −5° C. or lower, of 7 $\mu m^{-1/2}$ or less. The fragility index value thereof in water is preferably 10.5 $\mu m^{-1/2}$ or less, more preferably 9 $\mu m^{-1/2}$ or less, still more preferably 8 $\mu m^{-1/2}$ or less. Further, the fragility index value thereof in an atmosphere having a dew point of −5° C. or lower is preferably 6 $\mu m^{-1/2}$ or less, more preferably 5 $\mu m^{-1/2}$ or less, still more preferably 4 $\mu m^{-1/2}$ or less. The glass substrate III has properties that both the above glass substrates I and II have, and it is free from fracture during its use or its handling in any atmosphere.

With regard to the above fragility index value of a glass substrate, the present invention refers to a fragility index value B proposed by B. R. Lawn, et al (Journal of the American Chemical Society, Vol. 62, pages 347 to 350 (1979)). The fragility index value B is defined on the basis of the following equation.

$$B = Hv/Kc$$

wherein Hv is a Vickers hardness value and Kc is a fracture toughness value.

The Vickers hardness value Hv and the fracture toughness value Kc of a glass can be measured by a method in which an acute diamond presser of a Vickers hardness tester is pressed into the glass. That is, these values can be determined on the basis of the following equation using a pressed mark remaining in the glass surface when the Vickers presser is pressed into the glass.

$$Hv = 1.8544 \times \frac{P}{(2a)^2}$$

wherein P is a load applied for pressing the Vickers presser, and a is a diagonal length of a Vickers pressed mark. The fracture toughness Kc is determined according to the following equation using the size of a pressed mark remaining in a glass surface after the Vickers presser is pressed into the glass and the length of a crack that occurs in a corner of the pressed mark.

$$Kc = 0.026 \frac{E^{\frac{1}{2}} P^{\frac{1}{2}} a}{C^{\frac{3}{2}}}$$

wherein E is a Young's modulus of the glass, and C is a length of a crack that occurs in a corner of the pressed mark. The necessary condition of determining a correct Kc is that the ratio of C/a comes to be 2.5 or greater.

The fragility index value B of the glass can be calculated on the basis of B=Hv/Kc using the above-determined Hv and Kc values. However, the present invention employs values calculated according to the method described in JP-A-10-158028, for comparisons with Comparative Examples to be described later.

That is, the present invention employs values calculated according to the following equation.

$$B = 2.39 \times \left[\frac{C}{\alpha}\right]^{\frac{3}{2}} P^{\frac{1}{4}}$$

The fragility value calculated according to the equation shown in JP-A-10-158028 and the fragility value calculated according to the Hv/Kc equations differ from each other mostly by 5% or less, so that any glass can be correctly evaluated according to the equation shown in JP-A-10-158025. The equation shown in JP-A-10-158028 is actually introduced from the Hv/Kc equations of Lawn, et al., and these calculations are basically the same in concept.

The fragility index value in water refers to a value obtained by dropping pure water on a sample surface, pressing a Vickers presser into the sample surface through a water drop 30 seconds thereafter, to form a pressed mark and a crack, soaking the sample in pure water immediately thereafter to retain the sample in the pure water for 24 hours, then taking the sample out, wiping water off the sample, and measuring the sample for sizes of the pressed mark and the crack immediately thereafter. The fragility index value in an atmosphere having a dew point of −5° C. or lower refers to a value obtained by measuring a dew point around a sample in a dry nitrogen atmosphere to confirm that the dew point is −5° C. or lower, pressing a Vickers presser while confirming the dew point of −5° C. or lower, to form a pressed mark and a crack and measuring the pressed mark and the crack for sizes.

The glass substrates I, II and III for an information recording medium, provided by the present invention, have the above fragility index value, and they are not easily scratched or damaged and can be chemically strengthened equally to a conventional glass, so that the fracture thereof during their production steps and during use thereof can be decreased to a great extent.

The above glass substrates I to III can have a glass composition that comprises, by mol %, greater than 65%, as a total, of $SiO_2$ and at least one of $B_2O_3$ and $Al_2O_3$, 0 to 20% of RO in which R is at least one member selected from the group consisting of Ma, Ca, Zn, Sr and Ba, 0 to 28% of $R'_2O$ in which R' is at least one member selected from the group consisting of Li, Na and K, 0 to 10% of $TiO_2$ and 0 to 10% of $ZrO_2$, the total content of said components being at least 95 mol %.

In the above glass composition, the total content of $SiO_2$ and at least one of $B_2O_3$ and $Al_2O_3$ is preferably greater than 65 mol % but not more than 90 mol %, more preferably in the range of from 70 to 90 mol %, still more preferably 70 to 85 mol %. The content of $SiO_2$ is preferably 40 to 75 mol %, more preferably 50 to 70 mol %, and the content of $Al_2O_3$ is preferably 0 to 25 mol %, more preferably 1 to 20 mol %, still more preferably 2 to 15 mol %. The content of $B_2O_3$ is preferably 0 to 25 mol %, more preferably 1 to 25 mol %, still more preferably 2 to 20 mol %. The content of the above RO is preferably 15 mol % or less, more preferably 12 mol % or less. The content of MgO is preferably 15 mol % or less, more preferably 12 mol % or less, and the content of CaO is preferably 10 mol % or less, more preferably 8 mol % or less. The content of ZnO is preferably 10 mol % or less, more preferably 8 mol % or less, and the content of SrO is preferably 10 mol % or less, more preferably 8 mol % or less. The content of BaO is preferably 10 mol % or less, more preferably 5 mol % or less. The RO is preferably MgO.

The content of $R_2O$ is preferably 25 mol % or less, more preferably 10 to 25 mol % or less. The content of $Li_2O$ is preferably 20 mol % or less, more preferably 18 mol % or less, still more preferably 5 to 15 mol % or less, and the content of $Na_2O$ is preferably 20 mol % or less, more preferably 15 mol % or less, still more preferably 1 to 10 mol % or less. The content of $K_2O$ is preferably 15 mol % or less, more preferably 10 mol % or less, still more preferably 0 to 8 mol %. The total content of $SiO_2$, $B_2O_3$, $Al_2O_3$, RO and $R'_2O$ is preferably at least 85 mol %, more preferably at least 90 mol %, still more preferably at least 95 mol %.

Further, the content of $TiO_2$ is preferably 0 to 7 mol %, more preferably 0 to 5 mol %, and the content of $ZrO_2$ is preferably 0 to 8 mol %, more preferably 0 to 6 mol %. The total content of $SiO_2$, $B_2O_3$, $Al_2O_3$, RO, $R'_2O$, $TiO_2$ and $ZrO_2$ is preferably at least 95 mol %, more preferably at least 98 mol %. The molar ratio of $B_2O_3/Al_2O_3$ is preferably in the range of from 0.5 to 1.5, more preferably in the range of from 0.8 to 1.2.

As an example of combination of the above components, for example, the glass has a composition containing, by mol %, 40 to 75% of $SiO_2$, 1 to 25% of $B_2O_3$, 1 to 20% of $Al_2O_3$ (provided that the total content of $SiO_2$, $B_2O_3$ and $Al_2O_3$ is over 65%), 0 to 15% of MgO, 0 to 10% of ZnO, 0 to 10% of CaO, 0 to 10% of SrO, 0 to 10% of BaO (provided that the total content of MgO, CaO, ZnO, SrO and BaO is less than 20%), 0 to 20% of $Li_2O$, 0 to 20% of $Na_2O$, 0 to 15% of $K_2O$ (provided that the total content of $Li_2O$, $Na_2O$ and $K_2O$ is less than 28%), 0 to 10% of $TiO_2$ and 0 to 10% of $ZrO_2$, provided that the total content of said components of the composition is at least 95 mol %.

$SiO_2$ is a component for forming a network structure of a glass. When the content thereof is less than 40 mol %, the durability of the glass is poor, and the glass is liable to devitrify. When the content thereof exceeds 75 mol %, the high-temperature viscosity increases, so that the glass is not easily melted. Therefore, the content of $SiO_2$ is preferably in the range of from 40 to 75 mol %, particularly preferably in the range of from 50 to 70 mol %.

$B_2O_3$ is an important component in the present invention. When $B_2O_3$ is introduced in place of $SiO_2$, the fragility of the glass decreases to a great extent, the specific gravity of the glass is also decreased, and the high-temperature viscosity is decreased, so that the glass is remarkably improved in meltability. When the content of introduced $B_2O_3$ exceeds 25 mol %, the durability of the glass is degraded, and the glass is liable to cause a phase separation, so that no good glass can be produced in some cases. When the content of the introduced $B_2O_3$ is less than 1 mol %, the glass deteriorates in fragility, and the high-temperature viscosity increases, so that mass-production at a low cost may not be carried out any longer. Therefore, the content of $B_2O_3$ is preferably in the range of from 1 to 25 mol %, particularly preferably 2 to 20 mol %.

$Al_2O_3$ is important not only as a component for imparting the glass with heat resistance and durability and improving the glass in fragility, but also as a component for improving the glass in the stability of glass structure and the rigidity of the glass together with $SiO_2$. When the content thereof is less than 1 mol %, there is produced no or little effect on suppressing alkali elution from the glass, and it is difficult to produce a glass having excellent durability. When the above content is over 20 mol %, the high-temperature meltability of the glass is deteriorated. Therefore, the content of $Al_2O_3$ is preferably in the range of from 1 to 20 mol %, more preferably in the range of from 2 to 15 mol %.

MgO, CaO, ZnO, SrO and BaO are introduced for decreasing the viscosity of the glass during its melting to improve the glass in meltability and mass-productivity. When the total content of these is over 20 mol %, the fragility increases, so that the glass is liable to be scratched or damaged, and both the specific gravity and the devitrification temperature of the glass tend to increase. With regard to the content of each of MgO, CaO, ZnO, SrO and BaO, in view of both the meltability and the fragility of the glass, the content of MgO is 0 to 15 mol %, preferably 0 to 12 mol %, the content of ZnO is 0 to 10 mol %, preferably 0 to 8 mol %, the content of CaO is 0 to 10 mol %, preferably 0 to 8 mol %, the content of SrO is 0 to 10 mol %, preferably 0 to 8 mol %, the content of BaO is 0 to 10 mol %, preferably 0 to 5 mol %, and the total content of these components is preferably less than 20 mol %, more preferably 15 mol % or less.

$Li_2O$, $Na_2O$ and $K_2O$ are very useful components for decreasing the viscosity of the glass during its melting to promote the melting, and for decreasing the fragility of the glass. When the content of these components introduced is over 28 mol %, not only the glass is deteriorated in chemical durability, but also an alkali is precipitated on a glass surface to a greater extent, so that the alkali may corrode a magnetic film. With regard to the content of each of $Li_2O$, $Na_2O$ and $K_2O$, therefore, the content of $Li_2O$ is 0 to 20 mol %, preferably 0 to 18 mol %, the content of $Na_2O$ is 0 to 20 mol %, preferably 0 to 15 mol %, the content of $K_2O$ is 0 to 15 mol %, preferably 0 to 10 mol %, and the total content of these components is controlled to less than 28 mol %, preferably to 25 mol % or less.

The total content of $SiO_2$, $B_2O_3$ and $Al_2O_3$ is preferably in the range of from 70 to 90 mol %, more preferably 80 to 90 mol %, and the total content of RO and $R'_2O$ is preferably 5 to 35 mol %, more preferably 10 to 30 mol %, still more preferably 10 to 25 mol %, particularly preferably 10 to 22 mol %.

$ZrO_2$ and $TiO_2$ are introduced for improving the glass in chemical durability and rigidity. When a small amount of $ZrO_2$ and $TiO_2$ are added to a glass, the glass is improved in all of durability, elasticity and fragility. However, the specific gravity of the glass sharply increases, and when they are introduced in a large amount, the glass strongly tends to devitrify. The content of each of $ZrO_2$ is limited to 0 to 10 mol %, preferably to 0 to 7 mol %, and the content of $TiO_2$ is limited to 0 to 10 mol %, preferably 0 to 8 mol %. Further, the total content of the above components is at least 95 mol %.

In addition to the above components, the above glass may contain $As_2O_3$, $Sb_2O_3$, F, Cl and $SO_3$ in a total amount of 2 mol % or less for improving the glass in meltability, clarification and moldability. Further, the above glass may contain other oxides, i.e., rare earth metal oxides such as $Y_2O_3$ and $La_2O_3$ in an amount of 5 mol % or less, for improving the glass in durability and elastic modulus.

Further, the glass can also have a composition containing, by mol %, 55 to 75% of $SiO_2$, 0 to 20% of $B_2O_3$, 1 to 20% of $Al_2O_3$ (provided that the total content of $SiO_2$, $B_2O_3$ and $Al_2O_3$ is at least 65%), 0 to 15% of MgO, 0 to 10% of ZnO, 0 to 10% of CaO, 0 to 10% of SrO, 0 to 10% of BaO (provided that the total content of MgO, CaO, ZnO, SrO and BaO (content of RO) is 20% or less), 0 to 20% of $Li_2O$, 0 to 20% of $Na_2O$, 0 to 6% of $K_2O$ (provided that the total content of $Li_2O$, $Na_2O$ and $K_2O$ (content of $R'_2O$) is 28% or less), 0 to 10% of $TiO_2$ and 0 to 10% of $ZrO_2$, provided that the total content of said components of the composition is at least 95 mol %.

The glass substrate IV for an information recording medium, provided by the present invention, is formed of a glass containing, by mol %, 40 to 75% of $SiO_2$, 2 to 45% of $B_2O_3$ and/or $Al_2O_3$ and 0 to 40% of $R'_2O$ in which R' is at least one member selected from the group consisting of Li, Na and K, and having an $SiO_2+B_2O_3+R'_2O$ total content of at least 90 mol %.

In the above glass composition, the content of $SiO_2$ is preferably 50 to 70 mol %, the content of $B_2O_3$ is preferably 0 to 25 mol %, more preferably 1 to 25 mol %, still more preferably 2 to 20 mol %, and the content of $Al_2O_3$ is preferably 0 to 25 mol %, more preferably 1 to 20 mol %, still more preferably 2 to 15 mol %. The total content of $SiO_2$, $B_2O_3$ and $Al_2O_3$ is preferably 65 to 90 mol %, more preferably 70 to 90 mol %, still more preferably 70 to 85 mol %. The content of $R'_2O$ is preferably 0 to 28 mol % (provided that 0 is excluded when the content of RO is 0 mol %), more preferably 25 mol % or less, still more preferably 10 to 25 mol %. The content of $Li_2O$ is preferably 20 mol % or less, more preferably 18 mol % or less, still more preferably 5 to 15 mol %. The content of $Na_2O$ is preferably 20 mol % or less, more preferably 15 mol % or less, still more preferably 1 to 10 mol %. The content of $K_2O$ is preferably 15 mol % or less, more preferably 10 mol % or less, still more preferably 0 to 8 mol %. Further, the content of RO is preferably 15 mol % or less, more preferably 12 mol % or less. The content of MgO is preferably 15 mol % or less, more preferably 12 mol % or less, and the content of CaO is preferably 10 mol % or less, more preferably 8 mol % or less. The content of ZnO is preferably 10 mol % or less, more preferably 8 mol % or less, and the content of SrO is preferably 10 mol % or less, more preferably 8 mol % or less. The content of BaO is preferably 10 mol % or less, more preferably 5 mol % or less. RO is particularly preferably MgO.

The total content of RO and $R'_2O$ is preferably 5 to 35 mol %, more preferably 10 to 30 mol %, still more preferably 10 to 25 mol %, particularly preferably 0 to 22 mol %. Further, 0 to 10 mol % of $TiO_2$ may be contained, and the content of $TiO_2$ is preferably 0 to 7 mol %. Further, 0 to 10 mol % of $ZrO_2$ may be contained, and the content of $ZrO_2$ is preferably 0 to 7 mol %.

The fragility index value of the glass substrate IV in water can be adjusted to 12 $\mu m^{-1/2}$ or less, preferably to 10.5 $\mu m^{-1/2}$ or less, more preferably to 9 $\mu m^{-1/2}$ or less, still more preferably to 8 $\mu m^{-1/2}$ or less. Further, the fragility index value thereof in an atmosphere having a dew point of $-5°$ C. or lower can be adjusted to 7 $\mu m^{-1/2}$ or less, preferably to 6 $\mu m^{-1/2}$ or less, more preferably to 5 $\mu m^{-1/2}$ or less, still more preferably to 4 $\mu m^{-1/2}$ or less.

In the glass substrates I to IV for an information recording medium, provided by the present invention, the Young's modulus of each can be adjusted to at least 70 GPa, preferably to 75 GPa, more preferably to 85 GPa.

For preventing the deformation to be caused on the glass substrate due to resonance when an information recording medium having the glass substrate having a small thickness is rotated, preferably, the Young's modulus of the glass substrate is increased. For example, when a magnetic disk having a glass substrate having a diameter of 3.5 inches and a thickness of 0.635 mm and made of a glass having a Young's modulus of 70 GPa or higher is rotated at 10,000 rpm, a flying height of approximately 1 µm or less can be stably secured between the magnetic head and a recording and reproducing head.

When a glass substrate having a low fragility index value in water has a Young's modulus of at least 70 GPa, the glass substrate is remarkably free from the occurrence of a crack that may be caused when it is cut or polished in a state where it is soaked in a polishing solution or when it is handled in a state where it is wet with a polishing solution or a washing liquid.

Further, when a glass substrate having a low fragility index value in water and/or in a dry atmosphere has a Young's modulus of at least 70 GPa, the glass substrate does not easily suffer bending caused by a rotation or a load, so that the glass substrate is further free from the occurrence of a fracture that may be caused during the polishing of the glass substrate or the use of an information recording medium, particularly, when the information recording medium is rotated at a high speed.

Further, in the glass substrates I to IV for an information recording medium, provided by the present invention, the rigidity can be adjusted to at least 20 GPa, preferably to at least 25 GPa, more preferably to at least 30 GPa.

For preventing the deformation to be caused on the glass substrate due to resonance when an information recording medium having the glass substrate having a small thickness is rotated, preferably, the rigidity of the glass substrate is increased. For example, when a magnetic disk having a glass substrate having a diameter of 3.5 inches and a thickness of 0.635 mm and made of a glass having a rigidity of 20 GPa or higher is rotated at 10,000 rpm, a flying height of approximately 1 µm or less can be stably secured between the magnetic head and a recording and reproducing head.

Further, when a glass substrate having a low fragility index value in water has a rigidity of at least 20 GPa, the glass substrate is remarkably free from the occurrence of a crack that may be caused when it is cut or polished in a state where it is soaked in a polishing solution or when it is handled in a state where it is wet with a polishing solution or a washing liquid.

Further, when a glass substrate having a low fragility index value in water and/or in a dry atmosphere has a rigidity of at least 20 GPa, the glass substrate does not easily suffer bending caused by a rotation or a load, so that the glass substrate is further free from the occurrence of a fracture that may be caused during the polishing of the glass substrate or the use of an information recording medium, particularly, when the information recording medium is rotated at a high speed.

In the glass substrates I to IV for an information recording medium, provided by the present invention, the specific modulus (value obtained by dividing a Young's modulus by a density) thereof can be adjusted to at least $27 \times 10^6$ N·m/kg.

When the above specific modulus is $27 \times 10^6$ N·m/kg or more, the bending during the high-speed rotation of an information recording medium can be decreased to 2 µm or less, and as a result, a flying height of 1 µm or less can be stably secured. Further, the bending during the high-speed rotation is decreased, so that a glass substrate having a small fragility index value is more free from the occurrence of a fracture. The above specific modulus is more preferably $30 \times 10^6$ N·m/kg or more.

In the glass substrates I to IV for an information recording medium, provided by the present invention, the density thereof can be adjusted to 2.65 g/cm$^3$ or less, preferably to 2.50 g/cm$^3$ or less.

Further, the glass substrates I to IV for an information recording medium, provided by the present invention, have a fracture toughness value of at least 0.75 MPa/m$^{1/2}$, preferably at least 0.80 MPa/m$^{1/2}$, more preferably at least 0.83 MPa/m$^{1/2}$. When the fracture toughness is at least 0.75 MPa/m$^{1/2}$, the glass substrate is more free from the occurrence of a fracture during the processing of the glass substrate or during the use of an information recording medium.

The glass substrates I to IV for an information recording medium, provided by the present invention, are preferably made of a glass having a region wherein the glass has a viscosity of at least 1 Pa·s, in a range of temperatures equivalent to, and higher than, the liquidus temperature of the glass.

For obtaining a glass substrate for an information recording medium, it is required to prevent a glass from undergoing substantial devitrification during its production process. For this purpose, it is required at least to carry out the melting of raw materials and the feeding of a glass melt to a mold at a liquidus temperature or higher.

In the glass substrates I to IV for an information recording medium, provided by the present invention, therefore, the liquidus temperature thereof is preferably adjusted to 1,350° C. or lower, more preferably to 1,250° C. or lower, particularly preferably to 1,150° C. or lower.

When a molten glass that is being fed to a mold has a viscosity of less than 1 Pa·s, not only it is difficult to control the flow rate of the molten glass, but also it is difficult to produce a thin and flat glass substrate for an information recording medium by press-molding.

More preferably, the glass substrates I to IV for an information recording medium, provided by the present invention, are made of a glass having a region wherein the glass has a viscosity of at least 3 Pa·s, in a range of temperatures equivalent to, and higher than, the liquidus temperature of the glass.

In the glass substrates I to IV for an information recording medium, provided by the present invention, the glass transition point of a raw material glass can be adjusted to 470 to 640° C. When the glass transition point is too high, a temperature range that permits press-molding is narrowed, and it is difficult to press-mold a lass substrate having a small thickness. When the glass transition point is too low, the temperature range for heat treatment for improving magnetic properties, etc., is narrowed, which heat treatment is carried out when or after a magnetic film such as a recording layer is formed on the glass substrate. The glass transition point is preferably in the range of from 470 to 620° C.

The glass substrates I to IV for an information recording medium, provided by the present invention, are preferably made of a glass having a thermal expansion coefficient of at least $60 \times 10^{-7}$/° C. at a temperature of 100 to 300° C.

When information is recorded in an information recording medium such as a magnetic disk, an optical disk or a magneto-optical disk, or when information recorded in the information recording medium is reproduced, the information recording medium rotates in a state where the it is clamp-fixed to the spindle of a drive motor provided in an information processing device. When the thermal expansion coefficient of the information recording medium and the counterpart of the clamp are greatly different, the following problem is caused.

That is, when the information recording medium is rotated, the information recording medium, the spindle, the clamp, etc., are sharply temperature-increased up to approximately 90° C. due to the heat generation of the drive motor. When the thermal expansion coefficient of the information recording medium and the thermal expansion coefficient of the clamp differ greatly, the information recording medium and the clamp come loose due to the above increase in temperature, or the information recording medium is caused to suffer distortion or bending. As a result, a portion (track) where data is (to be) recorded in the information recording medium is displaced, and an error is liable to occur in recording or reproducing information. The above problem comes to be conspicuous particularly in a large substrate such as a 3.5-inch substrate.

Therefore, the glass substrates I to IV for an information recording medium, provided by the present invention, preferably, the thermal expansion coefficient thereof is as close to the thermal expansion coefficient of the above clamp as possible. Since the above clamp is generally made of a stainless alloy, the thermal expansion coefficient in the range of 100 to 300° C. of each of the glass substrates I to IV provided by the present invention is preferably at least $60\times10^{-7}$/° C., more preferably at least $70\times10^{-7}$/° C., still more preferably $70\times10^{-7}$/° C. to $120\times10^{-7}$/° C., particularly preferably $80\times10^{-7}$/° C. to $100\times10^{-7}$/° C.

The glass substrates I to IV for an information recording medium, provided by the present invention, may have no chemically strengthened layer or may have a chemically strengthened layer formed by a known chemical strengthening treatment as required. For carrying out the chemical strengthening treatment, it is preferred to select a composition suitable for the chemical strengthening treatment from the afore-mentioned composition range.

The chemically strengthening treatment can be carried out by an ion-exchange method. The ion-exchange method is carried out using a molten salt containing Na ion and K ion, and a chemically strengthened glass is obtained. The treatment molten salt containing Na ion and K ion is preferably selected from sodium nitrate, potassium nitrate or a molten salt of a mixture of these, while it shall not be limited thereto. A sulfate, a bisulfate, a carbonate or a halide may be used. The glass for use in the present invention has low fragility and high fracture toughness as described already, and comes to have high bending strength owing to then ion-exchange, so that the thus-obtained chemically strengthened glass has excellent durability against fracture.

The method for producing the glass substrate for an information recording medium, provided by the present invention, is not specially limited, and various methods can be employed. For example, a glass substrate for an information recording medium, having a desired size and a desired form, can be produced by melting a predetermined amount ratio of glass raw materials in air or an inert gas atmosphere by a high-temperature melting method, homogenizing the glass by bubbling or stirring, forming a sheet glass by a known pressing method, down drawing method or floating method, and carrying out processing to form a circular form, making of a center hole, processing of surfaces of inner and outer circumferences, cutting and polishing. The polishing is carried out by lapping with a polishing material or diamond pellets and polishing with a polishing material such as cerium oxide, whereby a surface accuracy in a range of from 0.1 to 0.6 nm can be attained.

The magnetic information recording medium of the present invention comprises any one of the above glass substrates I to IV and a magnetic recording layer formed thereon. As an example of the constitution of the magnetic information recording medium, there is a constitution in which an undercoat layer, a magnetic recording layer, a protective layer and a lubricant layer are consecutively formed on the above glass substrate.

The above magnetic recording layer can be selected, for example, from a Co—Cr layer, a Co—Cr—Pt layer, a Co—Ni—Cr layer, a Co—Ni—Pt layer, a Co—Ni—Cr—Pt layer or a Co—Cr—Ta layer. The undercoat layer can be selected, for example, from an Ni layer, an Ni—P layer or a Cr layer. As a protective layer, for example, a carbon film can be used, and for the lubricant layer, for example, a lubricant material such as perfluoropolyether can be used.

EXAMPLES

The present invention will be further specifically explained with reference to Examples, while the present invention shall not be limited by these Examples.

Glasses obtained in Examples were measured for physical properties by the following methods.

(1) Young's Modulus

A sample having a size of $20\times20\times100$ mm was prepared, and the sample was measured for a velocity of longitudinal wave (Vl) and a velocity of transverse wave when (Vs) when 5 MHz ultrasonic wave propagated through the above sample, with a sing around method acoustic velocity measuring apparatus (UVM-2, supplied by Cho-Onnpa Kogyosha), and a Young's modulus was determined on the basis of the following equation.

Young's modulus=$(4G^2-3G\cdot Vl^2\cdot\rho)/(G-Vl^2\cdot\rho)$ $G=Vs^2\cdot\rho$ $\rho$=sample density (g/cm$^3$)

(2) Rigidity

When the measurement was made for a Young's modulus in the above (1), a rigidity was obtained as G.

(3) Liquidus Temperature

A sample was placed in a container made of platinum, the container was left in a gradient-temperature furnace for 30 minutes, and the surface and the inside of the sample were observed for a crystal through an optical microscope. And, a lowest temperature at which no crystal precipitated was taken as a liquidus temperature.

(4) Glass Transition Point (Tg) and Sag Temperature (Td)

A sample having a size of 5 mm$\phi\times20$ mm was measured at a temperature elevation rate of +4° C./minute with a thermal-mechanical analyzer (TMA 8140) supplied by Rigakusha. SiO$_2$ was used as a reference sample.

(5) Thermal Expansion Coefficient

An average thermal expansion coefficient at 100 to 300° C. was employed, and the measurement thereof was conducted together with the measurement of glass transition point.

(6) Fragility Index Value

With a microhardness tester (MVK-E) supplied by K.K. Akashi Seisakusho, a Vickers presser was pressed into a plate-shaped sample having a thickness of 2 mm under a pressing load shown in Tables 1 to 15, to introduce a pressed mark and a crack into the sample.

For accurate measurements for a fragility index value, a Vickers hardness, a fracture toughness, etc., preferably, the pressing load is adjusted to such a value as to attain a probability of at least 60, more preferably, to such a value as to attain a probability of at least 70, still more preferably, to such a value as to attain a probability of at least 80. A Vickers pressed mark was measured for a diagonal length a, and a crack that occurred in a corner of the Vickers pressed mark caused in the sample surface when the Vickers presser was pressed was measured for a length C. A Vickers hardness Hv, a fracture toughness Kc and a fragility index value B were determined using the above measurement values on the basis of the equations (1) to (3).

For determining a fragility index value B, a Vickers hardness Hv, a fracture toughness Kc, etc., in water, a drop of pure water was dropped on the sample surface, and 30 seconds thereafter, the Vickers presser was pressed into the sample to introduce a pressed mark and a crack.

Further, for determining a fragility index value B, a Vickers hardness Hv, a fracture toughness Kc, etc., in an atmosphere having a dew point of −5° C. or lower, the Vickers presser was pressed into the sample to introduce a pressed mark and a crack in a dry nitrogen atmosphere while a dew point around the sample was −5° C. or lower.

Probability in Tables 1 to 14 refers to the probability of occurrences, per corner, of cracks that occur in four corners of a pressed mark.

Examples 1-81

$SiO_2$, $Al_2O$, $Al(OH)_3$, $B_2O_3$, $HBO_3$, MgO, $Mg(OH)_2$, $MgCO_3$, $CaCO_3$, $SrCO_3$, $BaCO_3$, ZnO, $Li_2CO_3$, $K_2CO_3$, $TiO_2$, $ZrO_2$, etc., were used as starting materials, and 300 to 1,500 g of each of the starting materials was weighed for obtaining glass compositions shown in Tables 1 to 14 and fully mixed to prepare a formulated batch. The formulated batch was placed in a platinum crucible and melted at 1,400 to 1,600° C. in air for approximately 3 to 8 hours to prepare a molten glass. The molten glass was cast into a carbon mold having a size of 40×40×20 mm, and gradually cooled to a glass transition temperature, and the glass was placed in an annealing furnace immediately thereafter, held for 1 hour and then cooled to room temperature while being held in the furnace. In the thus-obtained glasses, no crystal that was observable through a microscope was precipitated.

The thus-obtained glasses were processed to prepare samples for evaluations of various properties, and the samples were evaluated for physical properties. Tables 1 to 14 show the results.

TABLE 1

| | | Examples | | | | | |
|---|---|---|---|---|---|---|---|
| | | 1 | 2 | 3 | 4 | 5 | 6 |
| Composition (mol %) | $SiO_2$ | 0.0 | 10.0 | 20.0 | 30.0 | 40.0 | 45.0 |
| | $B_2O_3$ | 60.0 | 50.0 | 40.0 | 30.0 | 20.0 | 10.0 |
| | $Al_2O_3$ | 12.0 | 12.0 | 12.0 | 12.0 | 12.0 | 15.0 |
| | MgO | 8.0 | 8.0 | 8.0 | 8.0 | 8.0 | 10.0 |
| | CaO | 15.0 | 20.0 | 20.0 | 15.0 | 10.0 | 10.0 |
| | ZnO | — | — | — | — | — | — |
| | RO | 23.0 | 28.0 | 28.0 | 23.0 | 18.0 | 20.0 |
| | $Li_2O$ | — | — | — | — | — | 5.0 |
| | $Na_2O$ | — | — | — | 0.0 | 5.0 | 5.0 |
| | $K_2O$ | 5.0 | 0.0 | 0.0 | 5.0 | 5.0 | 0.0 |
| | $R'_2O$ | 5.0 | 0.0 | 0.0 | 5.0 | 10.0 | 10.0 |
| | $TiO_2$ | — | — | — | — | — | — |
| | $ZrO_2$ | — | — | — | — | — | — |
| | $SiO_2 + B_2O_3 + Al_2O_3$ | 72.0 | 72.0 | 72.0 | 72.0 | 72.0 | 70.0 |
| | $B_2O_3/Al_2O_3$ | 5.0 | 4.2 | 3.3 | 2.5 | 1.7 | 0.7 |
| | $RO + R'_2O$ | 28.0 | 28.0 | 28.0 | 28.0 | 28.0 | 30.0 |
| | $SiO_2 + B_2O_3 + Al_2O_3 + RO + R'_2O$ | 100.0 | 100.0 | 100.0 | 100.0 | 100.0 | 100.0 |
| | $SiO_2 + B_2O_3 + Al_2O_3 + R'_2O$ | 77.0 | 72.0 | 72.0 | 77.0 | 82.0 | 80.0 |
| | $SiO_2 + B_2O_3 + Al_2O_3 + RO + R'_2O + TiO_2 + ZrO_2$ | 100.0 | 100.0 | 100.0 | 100.0 | 100.0 | 100.0 |
| | Total | 100.0 | 100.0 | 100.0 | 100.0 | 100.0 | 100.0 |
| | Glass transition point Tg[° C.] | 552 | 612 | 622 | 590 | 565 | 554 |
| | Sag temperature Td [° C.] | 596 | 660 | 664 | 643 | 620 | 609 |
| | Thermal expansion coefficient $\alpha \times 10^{-7}$[/° C.] | 67 | 56 | 59 | 66 | 79 | 67 |
| | Density [g/cm³] | 2.373 | 2.490 | 2.522 | 2.472 | 2.478 | 2.547 |
| | Young's modulus E[GPa] | 65.28 | 80 | 81.4 | 75.52 | 72.71 | 87.97 |
| | Rigidity G [GPa] | 25.56 | — | — | 30.21 | 29.30 | 35.19 |
| In water | Pressing load [gF] | 1000 | 1000 | 1000 | 1000 | 1000 | 1000 |
| | Fragility index value B [$\mu m^{-1/2}$] | 11.0 | 9.4 | 10.6 | 7.7 | 8.2 | 9.8 |
| | Vickers Hardness Hv [GPa] | 4.6 | 5.3 | 5.8 | 5.3 | 5.2 | 6.1 |
| | Fracture toughness [MPa/m$^{1/2}$] | 0.46 | 0.61 | 0.56 | 0.73 | 0.66 | 0.64 |
| | Probability | 100 | 100 | 100 | 100 | 100 | 100 |
| In dry atmosphere $N_2$ | Pressing load [gF] | 1000 | 1000 | 1000 | 1000 | 1000 | 1000 |
| | Fragility index value B [$\mu m^{-1/2}$] | 6.0 | 5.0 | 6.1 | 6.0 | 5.6 | 5.9 |
| | Vickers hardness Hv [GPa] | — | — | — | 5.5 | 5.1 | 6.1 |
| | Fracture roughness Kc [MPa/m$^{1/2}$] | — | — | — | 0.93 | 0.98 | 1.06 |
| | Probability | — | — | — | 100 | 40 | 100 |

TABLE 2

| | | Examples | | | | | |
|---|---|---|---|---|---|---|---|
| | | 7 | 8 | 9 | 10 | 11 | 12 |
| Composition (mol %) | $SiO_2$ | 45.0 | 50.0 | 50.0 | 50.0 | 50.0 | 52.4 |
| | $B_2O_3$ | 20.0 | 10.0 | 10.0 | 10.0 | 20.0 | 23.8 |
| | $Al_2O_3$ | 10.0 | 10.0 | 10.0 | 12.0 | 12.0 | 9.5 |
| | MgO | 10.0 | 10.0 | 10.0 | 8.0 | 8.0 | 0.0 |
| | CaO | 5.0 | 10.0 | 10.0 | 20.0 | 0.0 | 0.0 |
| | ZnO | — | — | — | — | — | — |
| | RO | 15.0 | 20.0 | 20.0 | 28.0 | 8.0 | 0.0 |
| | $Li_2O$ | 0.0 | 0.0 | 5.0 | — | 0.0 | 0.0 |
| | $Na_2O$ | 5.0 | 5.0 | 5.0 | — | 5.0 | 4.8 |
| | $K_2O$ | 5.0 | 5.0 | 0.0 | 0.0 | 5.0 | 9.5 |
| | $R'_2O$ | 10.0 | 10.0 | 10.0 | 0.0 | 10.0 | 14.3 |
| | $TiO_2$ | — | — | — | — | — | — |
| | $ZrO_2$ | — | — | — | — | — | — |
| | $SiO_2 + B_2O_3 + Al_2O_3$ | 75.0 | 70.0 | 70.0 | 72.0 | 82.0 | 85.7 |
| | $B_2O_3/Al_2O_3$ | 2.0 | 1.0 | 1.0 | 0.8 | 1.7 | 2.5 |
| | $RO + R'_2O$ | 25.0 | 30.0 | 30.0 | 28.0 | 18.0 | 14.3 |
| | $SiO_2 + B_2O_3 + Al_2O_3 + RO + R'_2O$ | 100.0 | 100.0 | 100.0 | 100.0 | 100.0 | 100.0 |
| | $SiO_2 + B_2O_3 + Al_2O_3 + R'_2O$ | 85.0 | 80.0 | 80.0 | 72.0 | 92.0 | 100.0 |
| | $SiO_2 + B_2O_3 + Al_2O_3 + RO + R'_2O + TiO_2 + ZrO_2$ | 100.0 | 100.0 | 100.0 | 100.0 | 100.0 | 100.0 |
| | Total | 100.0 | 100.0 | 100.0 | 100.0 | 100.0 | 100.0 |
| | Glass transition point Tg [° C.] | 548 | 595 | 541 | 676 | 543 | 478 |
| | Sag temperature Td [° C.] | 625 | 676 | 596 | 733 | 614 | 551 |
| | Thermal expansion coefficient $\alpha \times 10^{-7}$ [/° C.] | 77 | 87 | 71 | 52 | 70 | 82 |
| | Density [g/cm³] | 2.424 | 2.518 | 2.540 | 2.598 | 2.336 | 2.292 |
| | Young's modulus E [GPa] | 68.82 | 76.62 | 88.53 | 86.1 | 61.54 | 53.42 |
| | Rigidity G [GPa] | 27.79 | 31.13 | 35.74 | — | 24.84 | 21.63 |
| In water | Pressing load [gF] | 1000 | 1000 | 1000 | 1000 | 1000 | 1000 |
| | Fragility index value B [$\mu m^{-1/2}$] | 6.9 | 9.3 | 9.7 | 9.6 | 5.7 | 6.6 |
| | Vickers Hardness Hv [GPa] | 5.1 | 5.5 | 5.7 | 5.9 | 4.5 | 4.2 |
| | Fracture toughness [MPa·m$^{1/2}$] | 0.76 | 0.61 | 0.63 | 0.64 | 0.85 | 0.67 |
| | Probability | 95 | 100 | 100 | 100 | 95 | 100 |
| In dry atmosphere $N_2$ | Pressing load [gF] | 5980 | 1000 | 1000 | 1000 | 6952 | 5980 |
| | Fragility index value B [$\mu m^{-1/2}$] | 4.5 | 5.9 | 6.1 | 5.4 | 3.4 | 3.4 |
| | Vickers hardness Hv [GPa] | 4.9 | 5.5 | 6.1 | 5.7 | 4.4 | 4.2 |
| | Fracture roughness Kc [MPa·m$^{1/2}$] | 1.17 | 0.96 | 1.03 | 1.12 | 1.40 | 1.31 |
| | Probability | 80 | 100 | 100 | 85 | 80 | 40 |

TABLE 3

| | | Examples | | | | | |
|---|---|---|---|---|---|---|---|
| | | 13 | 14 | 15 | 16 | 17 | 18 |
| Composition (mol %) | $SiO_2$ | 55.0 | 55.0 | 55.0 | 55.0 | 60.0 | 60.0 |
| | $B_2O_3$ | 10.0 | 15.0 | 20.0 | 25.0 | 10.0 | 10.0 |
| | $Al_2O_3$ | 12.0 | 10.0 | 10.0 | 10.0 | 2.5 | 5.0 |
| | MgO | 8.0 | 10.0 | 5.0 | 0.0 | 10.0 | 10.0 |
| | CaO | 5.0 | 0.0 | 0.0 | 0.0 | 0.0 | 0.0 |
| | ZnO | — | — | — | — | 0.0 | 0.0 |
| | RO | 13.0 | 10.0 | 5.0 | 0.0 | 10.0 | 10.0 |
| | $Li_2O$ | 0.0 | 0.0 | 0.0 | 0.0 | 0.0 | 0.0 |
| | $Na_2O$ | 5.0 | 5.0 | 5.0 | 5.0 | 12.5 | 10.0 |
| | $K_2O$ | 5.0 | 5.0 | 5.0 | 5.0 | 5.0 | 5.0 |
| | $R'_2O$ | 10.0 | 10.0 | 10.0 | 10.0 | 17.5 | 15.0 |
| | $TiO_2$ | — | — | — | — | 0.0 | 0.0 |
| | $ZrO_2$ | — | — | — | — | — | — |
| | $SiO_2 + B_2O_3 + Al_2O_3$ | 77.0 | 80.0 | 85.0 | 90.0 | 72.5 | 75.0 |
| | $B_2O_3/Al_2O_3$ | 0.8 | 1.5 | 2.0 | 2.5 | 4.0 | 2.0 |
| | $RO + R'_2O$ | 23.0 | 20.0 | 15.0 | 10.0 | 27.5 | 25.0 |
| | $SiO_2 + B_2O_3 + Al_2O_3 + RO + R'_2O$ | 100.0 | 100.0 | 100.0 | 100.0 | 100.0 | 100.0 |
| | $SiO_2 + B_2O_3 + Al_2O_3 + R'_2O$ | 87.0 | 90.0 | 95.0 | 100.0 | 90.0 | 90.0 |
| | $SiO_2 + B_2O_3 + Al_2O_3 + RO + R'_2O + TiO_2 + ZrO_2$ | 100.0 | 100.0 | 100.0 | 100.0 | 100.0 | 100.0 |
| | Total | 100.0 | 100.0 | 100.0 | 100.0 | 100.0 | 100.0 |
| | Glass transition point Tg [° C.] | 606 | 568 | 522 | 472 | 536 | 541 |
| | Sag temperature Td [° C.] | 678 | 659 | 612 | 558 | 595 | 606 |
| | Thermal expansion coefficient $\alpha \times 10^{-7}$ [/° C.] | 70 | 73 | 66 | 71 | 99 | 87 |
| | Density [g/cm³] | 2.439 | 2.365 | 2.307 | 2.238 | 2.470 | 2.442 |
| | Young's modulus E [GPa] | 72.07 | 65.21 | 58.72 | 49.65 | 73.94 | 72.54 |
| | Rigidity G [GPa] | 29.43 | 26.60 | 23.83 | 20.02 | 30.32 | 29.74 |
| In water | Pressing load [gF] | 1000 | 1000 | 1000 | 1000 | 1000 | 1000 |
| | Fragility index value B [$\mu m^{-1/2}$] | 6.7 | 5.9 | 5.8 | 5.4 | 9.7 | 6.3 |

TABLE 3-continued

|  |  | Examples | | | | | |
|---|---|---|---|---|---|---|---|
|  |  | 13 | 14 | 15 | 16 | 17 | 18 |
|  | Vickers Hardness Hv [GPa] | 5.0 | 4.8 | 4.4 | 3.9 | 5.1 | 5.1 |
|  | Fracture toughness [MPa/m$^{1/2}$] | 0.80 | 0.86 | 0.81 | 0.78 | 0.56 | 0.87 |
|  | Probability | 95 | 100 | 100 | 100 | 100 | 100 |
| In dry | Pressing load [gF] | 6952 | 5980 | 5980 | 5980 | 5980 | 5980 |
| atmosphere | Fragility index value B [μm$^{-1/2}$] | 4.4 | 3.6 | 3.6 | 3.1 | 4.9 | 4.4 |
| N$_2$ | Vickers hardness Hv [GPa] | 5.0 | 4.7 | 4.4 | 3.9 | 5.2 | 5.3 |
|  | Fracture roughness Kc [MPa/m$^{1/2}$] | 1.24 | 1.41 | 1.33 | 1.36 | 1.12 | 1.23 |
|  | Probability | 100 | 100 | 100 | 60 | 100 | 80 |

TABLE 4

|  |  | Examples | | | | | |
|---|---|---|---|---|---|---|---|
|  |  | 19 | 20 | 21 | 22 | 23 | 24 |
| Composition | SiO$_2$ | 60.0 | 60.0 | 60.0 | 60.0 | 60.0 | 60.0 |
| (mol %) | B$_2$O$_3$ | 10.0 | 10.0 | 10.0 | 10.0 | 10.0 | 10.0 |
|  | Al$_2$O$_3$ | 7.5 | 10.0 | 10.0 | 10.0 | 10.0 | 12.0 |
|  | MgO | 10.0 | 5.0 | 10.0 | 5.0 | 7.5 | 8.0 |
|  | CaO | 0.0 | 5.0 | 0.0 | 0.0 | 0.0 | 0.0 |
|  | ZnO | 0.0 | — | — | 5.0 | 0.0 | — |
|  | RO | 10.0 | 10.0 | 10.0 | 10.0 | 7.5 | 8.0 |
|  | Li$_2$O | 0.0 | 0.0 | 0.0 | 0.0 | 0.0 | 0.0 |
|  | Na$_2$O | 7.5 | 5.0 | 5.0 | 5.0 | 5.0 | 5.0 |
|  | K$_2$O | 5.0 | 5.0 | 5.0 | 5.0 | 5.0 | 5.0 |
|  | R'$_2$O | 12.5 | 10.0 | 10.0 | 10.0 | 10.0 | 10.0 |
|  | TiO$_2$ | 0.0 | — | — | 0.0 | 2.5 | — |
|  | ZrO$_2$ | 0.0 | — | — | 0.0 | 0.0 | — |
|  | SiO$_2$ + B$_2$O$_3$ + Al$_2$O$_3$ | 77.5 | 80.0 | 80.0 | 80.0 | 80.0 | 82.0 |
|  | B$_2$O$_3$/Al$_2$O$_3$ | 1.3 | 1.0 | 1.0 | 1.0 | 1.0 | 0.8 |
|  | RO + R'$_2$O | 22.5 | 20.0 | 20.0 | 20.0 | 17.5 | 18.0 |
|  | SiO$_2$ + B$_2$O$_3$ + Al$_2$O$_3$ + RO + R'$_2$O | 100.0 | 100.0 | 100.0 | 100.0 | 97.5 | 100.0 |
|  | SiO$_2$ + B$_2$O$_3$ + Al$_2$O$_3$ + R'$_2$O | 90.0 | 90.0 | 90.0 | 90.0 | 90.0 | 92.0 |
|  | SiO$_2$ + B$_2$O$_3$ + Al$_2$O$_3$ + RO + R'$_2$O + TiO$_2$ + ZrO$_2$ | 100.0 | 100.0 | 100.0 | 100.0 | 100.0 | 100.0 |
|  | Total | 100.0 | 100.0 | 100.0 | 100.0 | 100.0 | 100.0 |
| Glass transition point Tg [° C.] |  | 554 | 595 | 583 | 567 | 566 | 598 |
| Sag temperature Td [° C.] |  | 619 | 676 | 686 | 672 | 672 | 686 |
| Thermal expansion coefficient α × 10$^{-7}$ [/° C.] |  | 85 | 73 | 77 | 72 | 77 | 66 |
| Density [g/cm$^3$] |  | 2.409 | 2.419 | 2.382 | 2.448 | 2.386 | 2.347 |
| Young's modulus E [GPa] |  | 69.70 | 70.63 | 67.26 | 66.36 | 66.05 | 62.00 |
| Rigidity G [GPa] |  | 28.54 | 29.05 | 27.61 | 27.17 | 27.09 | — |
| In water | Pressing load [gF] | 1000 | 1000 | 1000 | 1000 | 1000 | 1000 |
|  | Fragility index value B [μm$^{-1/2}$] | 6.5 | 6.5 | 6.1 | 5.9 | 5.4 | 6.0 |
|  | Vickers Hardness Hv [GPa] | 5.0 | 5.3 | 5.0 | 4.9 | 4.8 | 5.1 |
|  | Fracture toughness [MPa/m$^{1/2}$] | 0.82 | 0.83 | 0.85 | 0.87 | 0.95 | 0.83 |
|  | Probability | 100 | 100 | 100 | 95 | 100 | 95 |
| In dry | Pressing load [gF] | 5980 | 5980 | 5980 | 5980 | 5980 | 5980 |
| atmosphere | Fragility index value B [μm$^{-1/2}$] | 4.2 | 4.5 | 4.0 | 3.9 | 3.8 | 4.9 |
| N$_2$ | Vickers hardness Hv [GPa] | 5.0 | 5.2 | 5.0 | 4.9 | 4.8 | 4.9 |
|  | Fracture roughness Kc [MPa/m$^{1/2}$] | 1.27 | 1.19 | 1.29 | 1.32 | 1.34 | 1.01 |
|  | Probability | 60 | 100 | 100 | 100 | 80 | 100 |

TABLE 5

|  |  | Examples | | | | | |
|---|---|---|---|---|---|---|---|
|  |  | 25 | 26 | 27 | 28 | 29 | 30 |
| Composition | SiO$_2$ | 60.0 | 60.0 | 65.0 | 65.0 | 65.0 | 65.0 |
| (mol %) | B$_2$O$_3$ | 15.0 | 20.0 | 0.0 | 5.0 | 5.0 | 5.0 |
|  | Al$_2$O$_3$ | 10.0 | 10.0 | 7.0 | 2.5 | 5.0 | 5.0 |
|  | MgO | 5.0 | 0.0 | 1.0 | 10.0 | 10.0 | 5.0 |
|  | CaO | 0.0 | 0.0 | 1.0 | 0.0 | 0.0 | 5.0 |
|  | ZnO | — | — | 0.0 | 0.0 | 0.0 | 0.0 |
|  | RO | 5.0 | 0.0 | 2.0 | 10.0 | 10.0 | 10.0 |
|  | Li$_2$O | 0.0 | 0.0 | 10.0 | 0.0 | 0.0 | 0.0 |
|  | Na$_2$O | 5.0 | 5.0 | 10.5 | 12.5 | 10.0 | 10.0 |
|  | K$_2$O | 5.0 | 5.0 | 2.5 | 5.0 | 5.0 | 5.0 |
|  | R'$_2$O | 10.0 | 10.0 | 23.0 | 17.5 | 15.0 | 15.0 |
|  | TiO$_2$ | — | — | 0.0 | 0.0 | 0.0 | 0.0 |

TABLE 5-continued

|  |  | Examples | | | | | |
| --- | --- | --- | --- | --- | --- | --- | --- |
|  |  | 25 | 26 | 27 | 28 | 29 | 30 |
|  | $ZrO_2$ | — | — | 3.0 | 0.0 | — | 0.0 |
|  | $SiO_2 + B_2O_3 + Al_2O_3$ | 85.0 | 90.0 | 72.0 | 72.5 | 75.0 | 75.0 |
|  | $B_2O_3/Al_2O_3$ | 1.5 | 2.0 | 0.0 | 2.0 | 1.0 | 1.0 |
|  | $RO + R'_2O$ | 15.0 | 10.0 | 25.0 | 27.5 | 25.0 | 25.0 |
|  | $SiO_2 + B_2O_3 + Al_2O_3 + RO + R'_2O$ | 100.0 | 100.0 | 97.0 | 100.0 | 100.0 | 100.0 |
|  | $SiO_2 + B_2O_3 + Al_2O_3 + R'_2O$ | 95.0 | 100.0 | 95.0 | 90.0 | 90.0 | 90.0 |
|  | $SiO_2 + B_2O_3 + Al_2O_3 + RO + R'_2O + TiO_2 + ZrO_2$ | 100.0 | 100.0 | 100.0 | 100.0 | 100.0 | 100.0 |
|  | Total | 100.0 | 100.0 | 100.0 | 100.0 | 100.0 | 100.0 |
|  | Glass transition point Tg [° C.] | 540 | 488 | 479 | 553 | 558 | 551 |
|  | Sag temperature Td [° C.] | 628 | 583 | 551 | 612.7 | 634 | 619 |
|  | Thermal expansion coefficient $\alpha \times 10^{-7}$ [/° C.] | 69 | 71 | 98 | 90 | 85 | 91 |
|  | Density [g/cm³] | 2.326 | 2.259 | 2.535 | 2.461 | 2.440 | 2.483 |
|  | Young's modulus E [GPa] | 61.15 | 52.00 | 82.25 | 73.65 | 72.10 | 74.95 |
|  | Rigidity G [GPa] | 24.81 | — | 33.42 | 30.35 | 29.73 | 30.81 |
| In water | Pressing load [gF] | 1000 | 1000 | 1000 | 1000 | 1000 | 1000 |
|  | Fragility index value B [$\mu m^{-1/2}$] | 6.3 | 6.2 | 9.5 | 7.7 | 7.6 | 9.9 |
|  | Vickers Hardness Hv [GPa] | 4.8 | 4.4 | — | 5.3 | 5.7 | 5.4 |
|  | Fracture toughness [MPa·m$^{1/2}$] | 0.78 | 0.72 | — | 0.72 | 0.73 | 0.56 |
|  | Probability | 100 | 80 | — | 100 | 100 | 100 |
| In dry atmosphere $N_2$ | Pressing load [gF] | 5980 | 5980 | 5980 | 5980 | 5980 | 5980 |
|  | Fragility index value B [$\mu m^{-1/2}$] | 3.8 | 3.2 | 5.0 | 5.8 | 4.9 | 5.6 |
|  | Vickers hardness Hv [GPa] | 4.8 | 4.1 | 6.0 | 5.6 | 5.8 | 5.4 |
|  | Fracture roughness Kc [MPa·m$^{1/2}$] | 1.28 | 1.36 | 1.18 | 0.97 | 1.13 | 0.99 |
|  | Probability | 100 | 80 | 100 | 100 | 100 | 100 |

TABLE 6

|  |  | Examples | | | | | |
| --- | --- | --- | --- | --- | --- | --- | --- |
|  |  | 31 | 32 | 33 | 34 | 35 | 36 |
| Composition (mol %) | $SiO_2$ | 65.0 | 65.0 | 65.0 | 65.0 | 65.0 | 65.0 |
|  | $B_2O_3$ | 5.0 | 5.0 | 5.0 | 5.0 | 5.0 | 5.0 |
|  | $Al_2O_3$ | 5.0 | 5.0 | 5.0 | 5.0 | 5.0 | 5.0 |
|  | MgO | 5.0 | 5.0 | 5.0 | 5.0 | 5.0 | 5.0 |
|  | CaO | 3.0 | 3.0 | 5.0 | 5.0 | 5.0 | 5.0 |
|  | ZnO | — | — | — | — | — | — |
|  | RO | 8.0 | 8.0 | 10.0 | 10.0 | 10.0 | 10.0 |
|  | $Li_2O$ | 2.0 | 0.0 | 2.0 | 2.0 | 2.0 | 4.0 |
|  | $Na_2O$ | 10.0 | 12.0 | 11.0 | 9.0 | 7.0 | 9.0 |
|  | $K_2O$ | 5.0 | 5.0 | 2.0 | 4.0 | 6.0 | 2.0 |
|  | $R'_2O$ | 17.0 | 17.0 | 15.0 | 15.0 | 15.0 | 15.0 |
|  | $TiO_2$ | 0.0 | 0.0 | 0.0 | 0.0 | 0.0 | 0.0 |
|  | $ZrO_2$ | — | — | — | — | — | — |
|  | $SiO_2 + B_2O_3 + Al_2O_3$ | 75.0 | 75.0 | 75.0 | 75.0 | 75.0 | 75.0 |
|  | $B_2O_3/Al_2O_3$ | 1.0 | 1.0 | 1.0 | 1.0 | 1.0 | 1.0 |
|  | $RO + R'_2O$ | 25.0 | 25.0 | 25.0 | 25.0 | 25.0 | 25.0 |
|  | $SiO_2 + B_2O_3 + Al_2O_3 + RO + R'_2O$ | 100.0 | 100.0 | 100.0 | 100.0 | 100.0 | 100.0 |
|  | $SiO_2 + B_2O_3 + Al_2O_3 + R'_2O$ | 92.0 | 92.0 | 90.0 | 90.0 | 90.0 | 90.0 |
|  | $SiO_2 + B_2O_3 + Al_2O_3 + RO + R'_2O + TiO_2 + ZrO_2$ | 100.0 | 100.0 | 100.0 | 100.0 | 100.0 | 100.0 |
|  | Total | 100.0 | 100.0 | 100.0 | 100.0 | 100.0 | 100.0 |
|  | Glass transition point Tg [° C.] | 511 | 540 | 524 | 526 | 523 | 507 |
|  | Sag temperature Td [° C.] | 581 | 608 | 599 | 593 | 595 | 572 |
|  | Thermal expansion coefficient $\alpha \times 10^{-7}$ [/° C.] | 92 | 95 | 83 | 85 | 87 | 106 |
|  | Density [g/cm³] | 2.473 | 2.477 | 2.485 | 2.482 | 2.477 | 2.478 |
|  | Young's modulus E [GPa] | 76.71 | 74.00 | 78.97 | 78.28 | 77.13 | 80.71 |
|  | Rigidity G [GPa] | 31.62 | 30.48 | 32.50 | 32.21 | 31.74 | 33.26 |
| In water | Pressing load [gF] | 1000 | 1000 | 1000 | 1000 | 1000 | 1000 |
|  | Fragility index value B [$\mu m^{-1/2}$] | 9.9 | 9.8 | 9.8 | 10.0 | 10.6 | 10.0 |
|  | Vickers Hardness Hv [GPa] | 5.6 | 5.3 | 5.7 | 5.8 | 5.8 | 5.8 |
|  | Fracture toughness [MPa·m$^{1/2}$] | 0.58 | 0.56 | 0.60 | 0.58 | 0.55 | 0.59 |
|  | Probability | 100 | 100 | 100 | 100 | 100 | 100 |
| In dry atmosphere $N_2$ | Pressing load [gF] | 5980 | 5980 | 5980 | 5980 | 5980 | 5980 |
|  | Fragility index value B [$\mu m^{-1/2}$] | 5.0 | 4.8 | 5.4 | 5.6 | 5.5 | 5.1 |
|  | Vickers hardness Hv [GPa] | 5.6 | 5.1 | 5.5 | 5.7 | 5.7 | 5.6 |
|  | Fracture roughness Kc [MPa·m$^{1/2}$] | 1.13 | 1.14 | 1.08 | 1.04 | 1.04 | 1.15 |
|  | Probability | 100 | 100 | 100 | 100 | 100 | 100 |

TABLE 7

| | | Examples | | | | | |
|---|---|---|---|---|---|---|---|
| | | 37 | 38 | 39 | 40 | 41 | 42 |
| Composition (mol %) | $SiO_2$ | 65.0 | 65.0 | 65.0 | 65.0 | 65.0 | 65.0 |
| | $B_2O_3$ | 5.0 | 5.0 | 5.0 | 5.0 | 5.0 | 5.0 |
| | $Al_2O_3$ | 5.0 | 5.0 | 5.0 | 5.0 | 5.0 | 5.0 |
| | MgO | 5.0 | 5.0 | 5.0 | 5.0 | 5.0 | 5.0 |
| | CaO | 5.0 | 5.0 | 5.0 | 5.0 | 5.0 | 5.0 |
| | ZnO | — | — | — | — | — | 0.0 |
| | RO | 10.0 | 10.0 | 10.0 | 10.0 | 10.0 | 10.0 |
| | $Li_2O$ | 4.0 | 4.0 | 6.0 | 6.0 | 6.0 | 8.0 |
| | $Na_2O$ | 7.0 | 5.0 | 7.0 | 5.0 | 3.0 | 5.0 |
| | $K_2O$ | 4.0 | 6.0 | 2.0 | 4.0 | 6.0 | 2.0 |
| | $R'_2O$ | 15.0 | 15.0 | 15.0 | 15.0 | 15.0 | 15.0 |
| | $TiO_2$ | 0.0 | 0.0 | 0.0 | 0.0 | 0.0 | 0.0 |
| | $ZrO_2$ | — | — | — | — | — | 0.0 |
| | $SiO_2 + B_2O_3 + Al_2O_3$ | 75.0 | 75.0 | 75.0 | 75.0 | 75.0 | 75.0 |
| | $B_2O_3/Al_2O_3$ | 1.0 | 1.0 | 1.0 | 1.0 | 1.0 | 1.0 |
| | $RO + R'_2O$ | 25.0 | 25.0 | 25.0 | 25.0 | 25.0 | 25.0 |
| | $SiO_2 + B_2O_3 + Al_2O_3 + RO + R'_2O$ | 100.0 | 100.0 | 100.0 | 100.0 | 100.0 | 100.0 |
| | $SiO_2 + B_2O_3 + Al_2O_3 + R'_2O$ | 90.0 | 90.0 | 90.0 | 90.0 | 90.0 | 90.0 |
| | $SiO_2 + B_2O_3 + Al_2O_3 + RO + R'_2O + TiO_2 + ZrO_2$ | 100.0 | 100.0 | 100.0 | 100.0 | 100.0 | 100.0 |
| | Total | 100.0 | 100.0 | 100.0 | 100.0 | 100.0 | 100.0 |
| | Glass transition point Tg [° C.] | 510 | 508 | 500 | 501 | 501 | 488 |
| | Sag temperature Td [° C.] | 579 | 579 | 566 | 568 | 571 | 552 |
| | Thermal expansion coefficient $\alpha \times 10^{-7}$ [/° C.] | 85 | 115 | 78 | 81 | 80 | 78 |
| | Density [g/cm³] | 2.474 | 2.469 | 2.470 | 2.465 | 2.460 | 2.464 |
| | Young's modulus E [GPa] | 79.81 | 78.63 | 82.37 | 81.16 | 79.50 | 83.61 |
| | Rigidity G [GPa] | 32.88 | 32.38 | 33.93 | 33.44 | 32.76 | 34.44 |
| In water | Pressing load [gF] | 1000 | 1000 | 1000 | 1000 | 1000 | 1000 |
| | Fragility index value B [$\mu m^{-1/2}$] | 10.1 | 10.5 | 10.0 | 9.9 | 10.4 | 9.9 |
| | Vickers Hardness Hv [GPa] | 5.9 | 5.8 | 5.9 | 5.9 | 5.9 | 6.1 |
| | Fracture toughness [$MPa/m^{1/2}$] | 0.58 | 0.56 | 0.60 | 0.60 | 0.57 | 0.61 |
| | Probability | 100 | 100 | 100 | 100 | 100 | 100 |
| In dry atmosphere $N_2$ | Pressing load [gF] | 5980 | 5980 | 5980 | 5980 | 5980 | 5980 |
| | Fragility index value B [$\mu m^{-1/2}$] | 5.6 | 5.1 | 4.9 | 5.0 | 5.2 | 4.7 |
| | Vickers hardness Hv [GPa] | 5.7 | 5.5 | 5.6 | 5.6 | 5.6 | 5.5 |
| | Fracture roughness Kc [$MPa/m^{1/2}$] | 1.04 | 1.13 | 1.13 | 1.17 | 1.11 | 1.25 |
| | Probability | 100 | 100 | 100 | 100 | 100 | 100 |

TABLE 8

| | | Examples | | | | | |
|---|---|---|---|---|---|---|---|
| | | 43 | 44 | 45 | 46 | 47 | 48 |
| Composition (mol %) | $SiO_2$ | 65.0 | 65.0 | 65.0 | 65.0 | 65.0 | 65.0 |
| | $B_2O_3$ | 5.0 | 5.0 | 5.0 | 5.0 | 5.0 | 5.0 |
| | $Al_2O_3$ | 5.0 | 5.0 | 5.0 | 5.0 | 5.0 | 7.0 |
| | MgO | 5.0 | 5.0 | 5.0 | 5.0 | 5.0 | 5.0 |
| | CaO | 5.0 | 5.0 | 5.0 | 0.0 | 0.0 | 3.0 |
| | ZnO | 0.0 | 0.0 | 0.0 | 0.0 | 0.0 | — |
| | RO | 10.0 | 10.0 | 10.0 | 5.0 | 5.0 | 8.0 |
| | $Li_2O$ | 8.0 | 8.0 | 0.0 | 8.0 | 2.0 | 0.0 |
| | $Na_2O$ | 3.0 | 1.0 | 11.0 | 10.0 | 10.0 | 10.0 |
| | $K_2O$ | 4.0 | 6.0 | 4.0 | 2.0 | 5.0 | 5.0 |
| | $R'_2O$ | 15.0 | 15.0 | 15.0 | 20.0 | 17.0 | 15.0 |
| | $TiO_2$ | 0.0 | 0.0 | 0.0 | 0.0 | 0.0 | 0.0 |
| | $ZrO_2$ | 0.0 | — | 0.0 | 0.0 | 3.0 | — |
| | $SiO_2 + B_2O_3 + Al_2O_3$ | 75.0 | 75.0 | 75.0 | 75.0 | 75.0 | 77.0 |
| | $B_2O_3/Al_2O_3$ | 1.0 | 1.0 | 1.0 | 1.0 | 1.0 | 0.7 |
| | $RO + R'_2O$ | 25.0 | 25.0 | 25.0 | 25.0 | 22.0 | 23.0 |
| | $SiO_2 + B_2O_3 + Al_2O_3 + RO + R'_2O$ | 100.0 | 100.0 | 100.0 | 100.0 | 97.0 | 100.0 |
| | $SiO_2 + B_2O_3 + Al_2O_3 + R'_2O$ | 90.0 | 90.0 | 90.0 | 95.0 | 92.0 | 92.0 |
| | $SiO_2 + B_2O_3 + Al_2O_3 + RO + R'_2O + TiO_2 + ZrO_2$ | 100.0 | 100.0 | 100.0 | 100.0 | 100.0 | 100.0 |
| | Total | 100.0 | 100.0 | 100.0 | 100.0 | 100.0 | 100.0 |
| | Glass transition point Tg [° C.] | 494 | 504 | 552 | 474 | 533 | 536 |
| | Sag temperature Td [° C.] | 561 | 577 | 622 | 536 | 615 | 596 |
| | Thermal expansion coefficient $\alpha \times 10^{-7}$ [/° C.] | 81 | 73 | 89 | 91 | 87 | 122 |
| | Density [g/cm³] | 2.458 | 2.446 | 2.485 | 2.449 | 2.525 | 2.462 |
| | Young's modulus E [GPa] | 82.10 | 79.04 | 75.27 | 79.92 | 77.29 | 71.94 |
| | Rigidity G [GPa] | 33.82 | 32.64 | 30.96 | 32.45 | 31.61 | 29.58 |
| In water | Pressing load [gF] | 1000 | 1000 | 1000 | 1000 | 1000 | 1000 |
| | Fragility index value B [$\mu m^{-1/2}$] | 9.8 | 9.9 | 9.9 | 9.5 | 9.0 | 8.5 |

TABLE 8-continued

|  |  | Examples | | | | | |
| --- | --- | --- | --- | --- | --- | --- | --- |
|  |  | 43 | 44 | 45 | 46 | 47 | 48 |
|  | Vickers Hardness Hv [GPa] | 5.9 | 5.7 | 5.8 | — | — | 5.1 |
|  | Fracture toughness [MPa/m$^{1/2}$] | 0.61 | 0.59 | 0.58 | — | — | 0.63 |
|  | Probability | 100 | 100 | 100 | — | — | 100 |
| In dry | Pressing load [gF] | 5980 | 5980 | 5980 | 5980 | 5980 | 5980 |
| atmosphere | Fragility index value B [μm$^{-1/2}$] | 4.7 | 4.8 | 5.7 | 4.6 | 4.3 | 5.1 |
| $N_2$ | Vickers hardness Hv [GPa] | 5.6 | 5.4 | 5.5 | 5.6 | 5.5 | 5.2 |
|  | Fracture roughness Kc [MPa/m$^{1/2}$] | 1.25 | 1.19 | 0.99 | 1.27 | 1.30 | 1.06 |
|  | Probability | 100 | 100 | 100 | 100 | 100 | 100 |

TABLE 9

|  |  | Examples | | | | | | |
| --- | --- | --- | --- | --- | --- | --- | --- | --- |
|  |  | 49 | 50 | 51 | 52 | 53 | 54 | 55 |
| Composition | $SiO_2$ | 65.0 | 65.0 | 65.0 | 65.0 | 65.4 | 65.4 | 65.4 |
| (mol %) | $B_2O_3$ | 5.0 | 5.0 | 7.5 | 10.0 | 0.0 | 0.0 | 0.0 |
|  | $Al_2O_3$ | 7.5 | 10.0 | 2.5 | 0.0 | 8.6 | 8.6 | 8.6 |
|  | MgO | 10.0 | 10.0 | 5.0 | 5.0 | 0.0 | 0.0 | 0.0 |
|  | CaO | 0.0 | 0.0 | 5.0 | 5.0 | 0.0 | 0.0 | 0.0 |
|  | ZnO | 0.0 | 0.0 | — | — | 0.0 | 0.0 | 0.0 |
|  | RO | 10.0 | 10.0 | 10.0 | 10.0 | 0.0 | 0.0 | 0.0 |
|  | $Li_2O$ | 0.0 | 0.0 | 0.0 | 0.0 | 12.5 | 7.5 | 0.0 |
|  | $Na_2O$ | 7.5 | 5.0 | 10.0 | 10.0 | 10.5 | 10.5 | 13.0 |
|  | $K_2O$ | 5.0 | 5.0 | 5.0 | 5.0 | 0.0 | 5.0 | 10.0 |
|  | $R'_2O$ | 12.5 | 10.0 | 15.0 | 15.0 | 23.0 | 23.0 | 23.0 |
|  | $TiO_2$ | 0.0 | 0.0 | 0.0 | 0.0 | 0.0 | 0.0 | 0.0 |
|  | $ZrO_2$ | — | — | — | — | 3.0 | 3.0 | 3.0 |
|  | $SiO_2 + B_2O_3 + Al_2O_3$ | 77.5 | 80.0 | 75.0 | 75.0 | 74.0 | 74.0 | 74.0 |
|  | $B_2O_3/Al_2O_3$ | 0.7 | 0.5 | 3.0 | — | 0.0 | 0.0 | 0.0 |
|  | $RO + R'_2O$ | 22.5 | 20.0 | 25.0 | 25.0 | 23.0 | 23.0 | 23.0 |
|  | $SiO_2 + B_2O_3 + Al_2O_3 + RO + R'_2O$ | 100.0 | 100.0 | 100.0 | 100.0 | 97.0 | 97.0 | 97.0 |
|  | $SiO_2 + B_2O_3 + Al_2O_3 + R'_2O$ | 90.0 | 90.0 | 90.0 | 90.0 | 97.0 | 97.0 | 97.0 |
|  | $SiO_2 + B_2O_3 + Al_2O_3 + RO + R'_2O + TiO_2 + ZrO_2$ | 100.0 | 100.0 | 100.0 | 100.0 | 100.0 | 100.0 | 100.0 |
|  | Total | 100.0 | 100.0 | 100.0 | 100.0 | 100.0 | 100.0 | 100.0 |
| Glass transition point Tg [° C.] |  | 577 | 631 | 557 | 559 | 498 | 491 | 534 |
| Sag temperature Td [° C.] |  | 658 | 752 | 622 | 623 | 564 | 568 | 629 |
| Thermal expansion coefficient α × 10$^{-7}$ [/° C.] |  | 76 | 70 | 87 | 89 | 89 | 116 | 113 |
| Density [g/cm$^3$] |  | 2.419 | 2.399 | 2.486 | 2.493 | 2.511 | 2.523 | 2.537 |
| Young's modulus E [GPa] |  | 71.46 | 70.77 | 76.10 | 78.41 | 84.13 | 79.70 | 71.31 |
| Rigidity G [GPa] |  | 29.51 | 29.49 | 31.35 | 32.37 | 34.71 | 32.82 | 29.30 |
| In water | Pressing load [gF] | 1000 | 1000 | 1000 | 1000 | 1000 | 1000 | 1000 |
|  | Fragility index value B [μm$^{-1/2}$] | 8.4 | 7.1 | 10.4 | 13.2 | 7.8 | 8.4 | 7.9 |
|  | Vickers Hardness Hv [GPa] | 5.6 | 5.1 | 5.4 | 5.9 | 5.6 | 5.7 | 5.4 |
|  | Fracture toughness [MPa/m$^{1/2}$] | 0.96 | 0.76 | 0.54 | 0.44 | 0.77 | 0.70 | 0.69 |
|  | Probability | 100 | 100 | 100 | 100 | 100 | 100 | 100 |
| In dry | Pressing load [gF] | 5980 | 5980 | 5980 | 5980 | 5980 | 5980 | 5980 |
| atmosphere | Fragility index value B [μm$^{-1/2}$] | 5.2 | 5.3 | 4.9 | 5.5 | 4.3 | 5.0 | 5.2 |
| $N_2$ | Vickers hardness Hv [GPa] | 5.6 | 5.2 | 5.2 | 5.5 | 5.4 | 5.5 | 4.9 |
|  | Fracture roughness Kc [MPa/m$^{1/2}$] | 1.05 | 1.01 | 1.13 | 1.05 | 1.37 | 1.16 | 1.02 |
|  | Probability | 100 | 100 | 100 | 100 | 100 | 100 | 100 |

TABLE 10

|  |  | Examples | | | | | |
| --- | --- | --- | --- | --- | --- | --- | --- |
|  |  | 56 | 57 | 58 | 59 | 60 | 61 |
| Composition | $SiO_2$ | 48.0 | 53.2 | 57.0 | 59.0 | 59.0 | 59.0 |
| (mol %) | $B_2O_3$ | 16.0 | 14.4 | 9.5 | 9.0 | 9.5 | 10.5 |
|  | $Al_2O_3$ | 16.0 | 14.4 | 9.5 | 9.0 | 9.5 | 10.5 |
|  | MgO | 0.0 | 0.0 | 2.0 | 3.0 | 2.0 | 0.0 |
|  | CaO | 0.0 | 0.0 | 0.0 | 0.0 | 0.0 | 0.0 |
|  | ZnO | 0.0 | 0.0 | 0.0 | 0.0 | 0.0 | 0.0 |
|  | RO | 0.0 | 0.0 | 2.0 | 3.0 | 2.0 | 0.0 |
|  | $Li_2O$ | 10.0 | 10.0 | 9.0 | 10.0 | 9.0 | 10.0 |
|  | $Na_2O$ | 8.0 | 6.0 | 9.0 | 10.0 | 9.0 | 5.0 |
|  | $K_2O$ | 2.0 | 2.0 | 2.0 | 0.0 | 2.0 | 5.0 |
|  | $R'_2O$ | 20.0 | 18.0 | 20.0 | 20.0 | 20.0 | 20.0 |

TABLE 10-continued

|  |  | Examples | | | | | |
|---|---|---|---|---|---|---|---|
|  |  | 56 | 57 | 58 | 59 | 60 | 61 |
|  | $TiO_2$ | 0.0 | 0.0 | 0.0 | 0.0 | 0.0 | 0.0 |
|  | $ZrO_2$ | 0.0 | 0.0 | 2.0 | 0.0 | 0.0 | 0.0 |
|  | $SiO_2 + B_2O_3 + Al_2O_3$ | 80.0 | 82.0 | 76.0 | 77.0 | 78.0 | 80.0 |
|  | $B_2O_3/Al_2O_3$ | 1.0 | 1.0 | 1.0 | 1.0 | 1.0 | 1.0 |
|  | $RO + R'_2O$ | 20.0 | 18.0 | 22.0 | 23.0 | 22.0 | 20.0 |
|  | $SiO_2 + B_2O_3 + Al_2O_3 + RO + R'_2O$ | 100.0 | 100.0 | 98.0 | 100.0 | 100.0 | 100.0 |
|  | $SiO_2 + B_2O_3 + Al_2O_3 + R'_2O$ | 100.0 | 100.0 | 96.0 | 97.0 | 98.0 | 100.0 |
|  | $SiO_2 + B_2O_3 + Al_2O_3 + RO + R'_2O + TiO_2 + ZrO_2$ | 100.0 | 100.0 | 100.0 | 100.0 | 100.0 | 100.0 |
|  | Total | 100.0 | 100.0 | 100.0 | 100.0 | 100.0 | 100.0 |
|  | Glass transition point Tg [° C.] | 475 | 483 | 484 | 483 | 476 | 473 |
|  | Sag temperature Td [° C.] | 525 | 539 | 543 | 534 | 530 | 529 |
|  | Thermal expansion coefficient $\alpha \times 10^{-7}$ [/° C.] | 90 | 77 | 89 | 84 | 87 | 84 |
|  | Density [g/cm³] | 2.382 | 2.359 | 2.492 | 2.456 | 2.444 | 2.415 |
|  | Young's modulus E [GPa] | 72.62 | 71.84 | 81.35 | 83.13 | 80.45 | 77.88 |
|  | Rigidity G [GPa] | 29.16 | 28.96 | 32.96 | 33.70 | 32.73 | 31.71 |
| In dry atmosphere $N_2$ | Pressing load [gF] | 6952 | 6952 | 6952 | 6952 | 6952 | 6952 |
|  | Fragility index value B [$\mu m^{-1/2}$] | 3.5 | 3.1 | 3.9 | 3.8 | 3.7 | 3.8 |
|  | Vickers hardness Hv [GPa] | 5.2 | 5.0 | 5.8 | 5.8 | 5.7 | 5.5 |
|  | Fracture roughness Kc [MPa·m$^{1/2}$] | 1.54 | 1.71 | 1.53 | 1.57 | 1.56 | 1.51 |
|  | Probability | 20 | 60 | 100 | 100 | 100 | 80 |

TABLE 11

|  |  | Examples | | | | | |
|---|---|---|---|---|---|---|---|
|  |  | 62 | 63 | 64 | 65 | 66 | 67 |
| Composition (mol %) | $SiO_2$ | 59.0 | 60.0 | 60.0 | 60.0 | 60.0 | 61.0 |
|  | $B_2O_3$ | 10.5 | 0.0 | 5.0 | 7.5 | 9.0 | 5.0 |
|  | $Al_2O_3$ | 10.5 | 15.0 | 15.0 | 7.5 | 9.0 | 12.0 |
|  | MgO | 0.0 | 5.0 | 0.0 | 5.0 | 0.0 | 5.0 |
|  | CaO | 0.0 | 0.0 | 0.0 | 0.0 | 0.0 | 0.0 |
|  | ZnO | 0.0 | 0.0 | 0.0 | 0.0 | 0.0 | 0.0 |
|  | RO | 0.0 | 5.0 | 0.0 | 5.0 | 0.0 | 5.0 |
|  | $Li_2O$ | 10.0 | 9.0 | 9.0 | 10.0 | 9.0 | 10.0 |
|  | $Na_2O$ | 10.0 | 9.0 | 9.0 | 5.0 | 9.0 | 5.0 |
|  | $K_2O$ | 0.0 | 2.0 | 2.0 | 5.0 | 2.0 | 2.0 |
|  | $R'_2O$ | 20.0 | 20.0 | 20.0 | 20.0 | 20.0 | 17.0 |
|  | $TiO_2$ | 0.0 | 0.0 | 0.0 | 0.0 | 0.0 | 0.0 |
|  | $ZrO_2$ | 0.0 | 0.0 | 0.0 | 0.0 | 2.0 | 0.0 |
|  | $SiO_2 + B_2O_3 + Al_2O_3$ | 80.0 | 75.0 | 80.0 | 75.0 | 78.0 | 78.0 |
|  | $B_2O_3/Al_2O_3$ | 1.0 | 0.0 | 0.3 | 1.0 | 1.0 | 0.4 |
|  | $RO + R'_2O$ | 20.0 | 25.0 | 20.0 | 25.0 | 20.0 | 22.0 |
|  | $SiO_2 + B_2O_3 + Al_2O_3 + RO + R'_2O$ | 100.0 | 100.0 | 100.0 | 100.0 | 98.0 | 100.0 |
|  | $SiO_2 + B_2O_3 + Al_2O_3 + R'_2O$ | 100.0 | 95.0 | 100.0 | 95.0 | 98.0 | 95.0 |
|  | $SiO_2 + B_2O_3 + Al_2O_3 + RO + R'_2O + TiO_2 + ZrO_2$ | 100.0 | 100.0 | 100.0 | 100.0 | 100.0 | 100.0 |
|  | Total | 100.0 | 100.0 | 100.0 | 100.0 | 100.0 | 100.0 |
|  | Glass transition point Tg [° C.] | 485 | 530 | 491 | 464 | 487 | 495 |
|  | Sag temperature Td [° C.] | 536 | 610 | 560 | 535 | 545 | 564 |
|  | Thermal expansion coefficient $\alpha \times 10^{-7}$ [/° C.] | 82 | 93 | 88 | 91 | 87 | 78 |
|  | Density [g/cm³] | 2.420 | 2.464 | 2.428 | 2.428 | 2.48 | 2.422 |
|  | Young's modulus E [GPa] | 80.13 | 82.79 | 78.75 | 79.23 | 81.53 | 80.56 |
|  | Rigidity G [GPa] | 32.65 | 33.71 | 32.05 | 32.38 | 33.22 | 32.77 |
| In dry atmosphere $N_2$ | Pressing load [gF] | 6952 | 6952 | 6952 | 6952 | 6952 | 6952 |
|  | Fragility index value B [$\mu m^{-1/2}$] | 3.5 | 4.2 | 4.1 | 4.2 | 3.9 | 3.9 |
|  | Vickers hardness Hv [GPa] | 5.5 | 5.7 | 5.4 | 5.8 | 5.8 | 5.5 |
|  | Fracture roughness Kc [MPa·m$^{1/2}$] | 1.65 | — | — | 1.40 | 1.50 | — |
|  | Probability | 75 | 80 | 100 | 60 | 80 | 100 |

TABLE 12

|  |  | Examples | | | | | |
|---|---|---|---|---|---|---|---|
|  |  | 68 | 69 | 70 | 71 | 72 | 73 |
| Composition (mol %) | $SiO_2$ | 61.0 | 62.0 | 63.0 | 63.0 | 63.0 | 65.0 |
|  | $B_2O_3$ | 9.5 | 7.0 | 7.5 | 8.5 | 8.5 | 2.5 |
|  | $Al_2O_3$ | 9.5 | 7.0 | 7.5 | 8.5 | 8.5 | 10.5 |
|  | MgO | 0.0 | 2.0 | 2.0 | 0.0 | 0.0 | 5.0 |

TABLE 12-continued

|  |  | Examples | | | | | |
|---|---|---|---|---|---|---|---|
|  |  | 68 | 69 | 70 | 71 | 72 | 73 |
|  | CaO | 0.0 | — | 0.0 | 0.0 | 0.0 | 0.0 |
|  | ZnO | 0.0 | — | 0.0 | 0.0 | 0.0 | 0.0 |
|  | RO | 0.0 | 2.0 | 2.0 | 0.0 | 0.0 | 5.0 |
|  | $Li_2O$ | 10.0 | 9.0 | 9.0 | 10.0 | 9.0 | 10.0 |
|  | $Na_2O$ | 10.0 | 9.0 | 9.0 | 10.0 | 9.0 | 5.0 |
|  | $K_2O$ | 0.0 | 2.0 | 2.0 | 0.0 | 2.0 | 2.0 |
|  | $R'_2O$ | 20.0 | 20.0 | 20.0 | 20.0 | 20.0 | 17.0 |
|  | $TiO_2$ | 0.0 | — | 0.0 | 0.0 | 0.0 | 0.0 |
|  | $ZrO_2$ | 0.0 | 2.0 | 0.0 | 0.0 | 0.0 | 0.0 |
|  | $SiO_2 + B_2O_3 + Al_2O_3$ | 80.0 | 76.0 | 78.0 | 80.0 | 80.0 | 78.0 |
|  | $B_2O_3/Al_2O_3$ | 1.0 | 1.0 | 1.0 | 1.0 | 1.0 | 0.2 |
|  | $RO + R'_2O$ | 20.0 | 22.0 | 22.0 | 20.0 | 20.0 | 22.0 |
|  | $SiO_2 + B_2O_3 + Al_2O_3 + RO + R'_2O$ | 100.0 | 98.0 | 100.0 | 100.0 | 100.0 | 100.0 |
|  | $SiO_2 + B_2O_3 + Al_2O_3 + R'_2O$ | 100.0 | 96.0 | 98.0 | 100.0 | 100.0 | 95.0 |
|  | $SiO_2 + B_2O_3 + Al_2O_3 + RO + R'_2O + TiO_2 + ZrO_2$ | 100.0 | 100.0 | 100.0 | 100.0 | 100.0 | 100.0 |
|  | Total | 100.0 | 100.0 | 100.0 | 100.0 | 100.0 | 100.0 |
|  | Glass transition point Tg [° C.] | 483 | 480 | 471 | 480 | 479 | 493 |
|  | Sag temperature Td [° C.] | 535 | 540 | 528 | 533 | 537 | 568 |
|  | Thermal expansion coefficient $\alpha \times 10^{-7}$ [/° C.] | 85 | 86 | 89 | 84 | 89 | 80 |
|  | Density [g/cm³] | 2.427 | 2.450 | 2.448 | 2.431 | 2.431 | 2.421 |
|  | Young's modulus E [GPa] | 81.00 | 83.00 | 80.96 | 81.57 | 79.91 | 80.67 |
|  | Rigidity G [GPa] | 33.06 | — | 33.00 | 33.37 | 32.71 | 33.09 |
| In dry atmosphere $N_2$ | Pressing load [gF] | 6952 | 6952 | 6952 | 6952 | 6952 | 6952 |
|  | Fragility index value B [$\mu m^{-1/2}$] | 3.7 | 4.0 | 4.1 | 3.9 | 3.8 | 4.1 |
|  | Vickers hardness Hv [GPa] | 5.6 | 5.7 | 5.7 | 5.5 | 5.5 | 5.7 |
|  | Fracture roughness Kc [$MPa/m^{1/2}$] | 1.58 | — | 1.44 | 1.51 | 1.52 | — |
|  | Probability | 40 | — | 100 | 100 | 100 | 100 |

TABLE 13

|  |  | Examples | | | |
|---|---|---|---|---|---|
|  |  | 74 | 75 | 76 | 77 |
| Composition (mol %) | $SiO_2$ | 65.0 | 65.0 | 65.0 | 65.0 |
|  | $B_2O_3$ | 5.0 | 7.5 | 7.5 | 7.5 |
|  | $Al_2O_3$ | 5.0 | 7.5 | 7.5 | 7.5 |
|  | MgO | 0.0 | 0.0 | 0.0 | 0.0 |
|  | CaO | 0.0 | 0.0 | 0.0 | 0.0 |
|  | ZnO | 0.0 | 0.0 | 0.0 | 0.0 |
|  | RO | 0.0 | 0.0 | 0.0 | 0.0 |
|  | $Li_2O$ | 10.0 | 5.0 | 10.0 | 10.0 |
|  | $Na_2O$ | 10.0 | 10.0 | 5.0 | 7.5 |
|  | $K_2O$ | 5.0 | 5.0 | 5.0 | 2.5 |
|  | $R'_2O$ | 25.0 | 20.0 | 20.0 | 20.0 |
|  | $TiO_2$ | 0.0 | 0.0 | 0.0 | 0.0 |
|  | $ZrO_2$ | 0.0 | 0.0 | 0.0 | 0.0 |
|  | $SiO_2 + B_2O_3 + Al_2O_3$ | 75.0 | 80.0 | 80.0 | 80.0 |
|  | $B_2O_3/Al_2O_3$ | 1.0 | 1.0 | 1.0 | 1.0 |
|  | $RO + R'_2O$ | 25.0 | 20.0 | 20.0 | 20.0 |
|  | $SiO_2 + B_2O_3 + Al_2O_3 + RO + R'_2O$ | 100.0 | 100.0 | 100.0 | 100.0 |
|  | $SiO_2 + B_2O_3 + Al_2O_3 + R'_2O$ | 100.0 | 100.0 | 100.0 | 100.0 |
|  | $SiO_2 + B_2O_3 + Al_2O_3 + RO + R'_2O + TiO_2 + ZrO_2$ | 100.0 | 100.0 | 100.0 | 100.0 |
|  | Total | 100.0 | 100.0 | 100.0 | 100.0 |
|  | Glass transition point Tg [° C.] | 451 | 482 | 475 | 472 |
|  | Sag temperature Td [° C.] | 510 | 541 | 538 | 529 |
|  | Thermal expansion coefficient $\alpha \times 10^{-7}$ [/° C.] | 107 | 95 | 85 | 84 |
|  | Density [g/cm³] | 2.453 | 2.452 | 2.420 | 2.429 |
|  | Young's modulus E [GPa] | 77.98 | 77.81 | 78.83 | 80.62 |
|  | Rigidity G [GPa] | 31.79 | 31.87 | 32.27 | 33.01 |
| In dry atmosphere $N_2$ | Pressing load [gF] | 6952 | 6952 | 6952 | 6952 |
|  | Fragility index value B [$\mu m^{-1/2}$] | 4.0 | 4.3 | 4.1 | 3.9 |
|  | Vickers hardness Hv [GPa] | 5.4 | 5.4 | 5.7 | 5.6 |
|  | Fracture roughness Kc [$MPa/m^{1/2}$] | 1.42 | 1.31 | 1.42 | 1.51 |
|  | Probability | 100 | 100 | 100 | 80 |

TABLE 14

| | | Examples | | | |
|---|---|---|---|---|---|
| | | 78 | 79 | 80 | 81 |
| Composition (mol %) | $SiO_2$ | 65.0 | 65.0 | 65.0 | 65.0 |
| | $B_2O_3$ | 7.5 | 7.5 | 7.5 | 10.0 |
| | $Al_2O_3$ | 7.5 | 7.5 | 7.5 | 0.0 |
| | MgO | 0.0 | 0.0 | 0.0 | 5.0 |
| | CaO | 0.0 | 0.0 | 0.0 | 0.0 |
| | ZnO | 0.0 | 0.0 | 0.0 | 0.0 |
| | RO | 0.0 | 0.0 | 0.0 | 5.0 |
| | $Li_2O$ | 10.0 | 10.0 | 9.0 | 5.0 |
| | $Na_2O$ | 10.0 | 10.0 | 9.0 | 10.0 |
| | $K_2O$ | 0.0 | 0.0 | 2.0 | 5.0 |
| | $R'_2O$ | 20.0 | 20.0 | 20.0 | 20.0 |
| | $TiO_2$ | 0.0 | 0.0 | 0.0 | 0.0 |
| | $ZrO_2$ | 0.0 | 0.0 | 0.0 | 0.0 |
| | $SiO_2 + B_2O_3 + Al_2O_3$ | 80.0 | 80.0 | 80.0 | 75.0 |
| | $B_2O_3/Al_2O_3$ | 1.0 | 1.0 | 1.0 | — |
| | $RO + R'_2O$ | 20.0 | 20.0 | 20.0 | 25.0 |
| | $SiO_2 + B_2O_3 + Al_2O_3 + RO + R'_2O$ | 100.0 | 100.0 | 100.0 | 100.0 |
| | $SiO_2 + B_2O_3 + Al_2O_3 + R'_2O$ | 100.0 | 100.0 | 100.0 | 95.0 |
| | $SiO_2 + B_2O_3 + Al_2O_3 + RO + R'_2O + TiO_2 + ZrO_2$ | 100.0 | 100.0 | 100.0 | 100.0 |
| | Total | 100.0 | 100.0 | 100.0 | 100.0 |
| | Glass transition point Tg [° C.] | 483 | 478 | 477 | 484 |
| | Sag temperature Td [° C.] | 544 | 533 | 533 | 541 |
| | Thermal expansion coefficient $\alpha \times 10^{-7}$ [/° C.] | 83 | 83 | 85 | 98 |
| | Density [g/cm³] | 2.440 | 2.431 | 2.434 | 2.477 |
| | Young's modulus E [GPa] | 82.07 | 82.00 | 80.81 | 80.64 |
| | Rigidity G [GPa] | 33.58 | 33.65 | 33.15 | 33.02 |
| In dry atmosphere $N_2$ | Pressing load [gF] | 1000 | 1000 | 1000 | 1000 |
| | Fragility index value B [$\mu m^{-1/2}$] | 3.9 | 3.8 | 3.9 | 4.2 |
| | Vickers hardness Hv [GPa] | 5.6 | 5.6 | 5.7 | 5.7 |
| | Fracture roughness Kc [MPa/m$^{1/2}$] | 1.52 | 1.53 | 1.48 | 1.39 |
| | Probability | 80 | 100 | 100 | 100 |

Comparative Examples 1-3

Table 15 shows physical properties of glasses described in JP-A-10-158028.

TABLE 15

| | | Comp. Ex. 1 | Comp. Ex. 2 | Comp. Ex. 3 |
|---|---|---|---|---|
| Composition (mol %) | $SiO_2$ | 69.28 | 69.94 | 68.94 |
| | $B_2O_3$ | — | — | — |
| | $Al_2O_3$ | 2.5 | 2.51 | 4.24 |
| | MgO | 6.97 | 6.96 | 5.77 |
| | CaO | 7.97 | 8 | 8.28 |
| | SrO | — | 0.24 | 1.81 |
| | $Li_2O$ | — | — | — |
| | $Na_2O$ | 1.96 | 4.93 | 1.46 |
| | $K_2O$ | 9.56 | 6.75 | 9.25 |
| | $TiO_2$ | — | — | — |
| | $ZrO_2$ | 1.76 | 0.66 | 0.26 |
| | Total | 100.0 | 100.0 | 100.0 |
| | Glass transition point Tg [° C.] | 657 | 623 | 658 |
| | Sag temperature Td [° C.] | 780 | 710 | 732 |
| | Thermal expansion coefficient $\alpha \times 10^{-7}$ [/° C.] | 86.8 | 85.8 | 82.8 |
| | Density [g/cm³] | 2.52 | 2.49 | 2.51 |
| | Young's modulus E [GPa] | 80.5 | 80.3 | 81.5 |
| | Pressing load [gF] | 1000 | 1000 | 1000 |
| | Fragility index value B [$\mu m^{-1/2}$] | 7.2 | 7.2 | 7.1 |
| | Vickers hardness Hv [GPa] | 6.1 | 6.1 | 6.2 |
| | Fracture roughness Kc [MPa/m$^{1/2}$] | 0.90 | 0.91 | 1.05 |

Example 82

Using the glasses obtained in Examples 1-81, glass substrates for an information recording medium and magnetic disks were prepared by consecutively carrying out (1) a preliminary lapping step, (2) a form processing step, (3) a precision lapping step, (4) a step of processing an end surface to form a mirror face, (5) a first polishing step, (6) a second polishing step, (7) an inspection step and (8) a magnetic disk production step.

Pure water was used as a water in a polishing liquid for use with polishing machines from the (4) step of processing an end-surface to form a mirror face to the (6) second polishing step.

(1) Preliminary Lapping Step

First, a disk-shaped glass substrate having a diameter of 96 mm and a thickness of 1.5 mm was obtained from a molten glass by a direct-pressing method using an upper mold member, a lower mold member and a sleeve. In this case, besides the direct-pressing, a down drawing method or a floating method may be employed to form a sheet glass, and the sheet glass may be cut with a cutting grinder to obtain a disk-shaped glass substrate.

Then, the glass substrate was subjected to a lapping step for improving the glass substrate in dimensional accuracy and form accuracy. The lapping step was carried out with a double-side lapping apparatus using abrasive grains having a particle size of #400. Specifically, alumina abrasive grains having a particle size of #400 were used, and a load of approximately 980 N was employed. And, both the surfaces of the glass substrate encased in a carrier were lapped to attain a surface accuracy of 0 to 1 μm and a surface roughness ($R_{max}$) of approximately 6 μm by rotating a sun gear and an internal gear.

(2) Form Processing Step

Then, a hole was made in the central portion of the glass substrate with a cylindrical grinder, and the circumferential (outer) end surface of the glass substrate was cut with the cylindrical grinder until the glass substrate had a diameter of 95 mm. Then, the outer end surface and the inner end surface of the glass substrate were chamfered. In this case, the end surfaces of the glass substrate had a surface roughness, $R_{max}$, of approximately 4 µm.

(3) Precision Lapping Step

Then, the abrasive grains were changed to abrasive grains having a particle size of #1,000, and the glass substrate surfaces were lapped, to attain a surface roughness, $R_{max}$, of approximately 2 µm and a surface roughness, Ra, of approximately 0.2 µm. Then, the glass substrate that was finished with the above lapping step was consecutively immersed in a neutral detergent and water (with application of ultrasonic waves) to carry out ultrasonic cleaning.

(4) Step of Processing End Surface to Form Mirror Surface

Then, while the glass substrate was rotated, the (inner and outer) end surfaces of the glass substrate were polished by brush polishing until the end surfaces had a surface roughness, $R_{max}$, of 1 µm and a surface roughness, Ra, of approximately 0.3 µm. Then, the glass substrate that was finished with the above mirror-surface processing of the end surfaces was cleaned with water.

(5) First Polishing Step

Then, the first polishing step was carried out with a double-side polishing apparatus for removing scratches and strains that were caused to remain by the above lapping step. In the double-side polishing apparatus, the glass substrate held with a carrier was intimately placed between polishing pads attached to upper and lower bases, and the carrier was engaged with a sun gear and an internal gear to sandwich and press the above glass substrate with the upper and lower bases. Thereafter, a polishing liquid was supplied into between the polishing pads and those surfaces of the glass substrate which were to be polished, and the glass substrate was rotated, whereby the both the surfaces of the glass substrate were concurrently polished while the glass substrate rotated while turning on its axis on the bases. As a double-side polishing apparatus in Examples hereinafter, the same apparatus was used.

Specifically, a hard polisher (hard polyurethane foam) was used as a polisher, and the polishing step was carried out. Polishing conditions were as follows. Cerium oxide (average particle diameter 1.3 µm)+pure water were used as a polishing liquid. A load was set at 9.8 mN/mm$^2$, and a polishing time period was set for 15 minutes. The glass substrate that was finished with the above first polishing step was consecutively immersed in washing vessels of neutral detergent, pure water, pure water, isopropyl alcohol (IPA) and IPA (vapor drying) to carry out ultrasonic cleaning, and dried.

(6) Second Polishing Step

Then, the same double-side polishing apparatus as that used in the first polishing step was used, the polisher was replaced with a soft polisher (suede pads), and the second polishing step was carried out. The second polishing step was carried out, for example, for decreasing the surface roughness, Ra, to approximately 1.0 to 0.3 µm while maintaining the flat surface obtained by the above first polishing step. Polishing conditions were as follows. Cerium oxide (average particle diameter 0.8 µm)+pure water were used as a polishing liquid. A load was set at 9.8 mN/mm$^2$, and a polishing time period was set for 15 minutes. The glass substrate that was finished with the above second polishing step was consecutively immersed in washing vessels of neutral detergent, pure water, pure water, IPA and IPA (vapor drying) to carry out ultrasonic cleaning, and dried.

The glass substrates that were processed as described above in this Example were not chemically strengthened but did not undergo any fracture during the above polishing steps and during handlings thereof between one step and another step.

(7) Inspection Step

The surfaces of the glass substrates that were finished with the above drying step were visually inspected and closely inspected by utilizing light reflection, scattering and transmission. As a result, defects such as scratches were found in the surfaces of the glass substrates.

The main surfaces of the glass substrates that were finished with the above step were measured for surface roughness with an atomic force microscope, to show that glass substrates for magnetic disks, which glass substrates had an ultra-smooth surface having an $R_{max}$ of 2.13 nm and an Ra of 0.20 nm, were obtained.

(8) Magnetic Disk Production Step

An NiAl seed layer, a CrV undercoat layer, CoPtCrB magnetic layer and a carbon halide protective layer were consecutively formed on both the main surfaces of each of the glass substrates (for magnetic disks) obtained through the above steps. Further, a perfluoropolyether lubricant layer was formed by a dipping method, to give magnetic disks. The thus-obtained magnetic disks were tested for a touch down height, to show an excellent value of 5 nm. Further, the magnetic disks were subjected to a load-and-load test (100,000 times) to show that no head clashed.

Example 83

Magnetic disks were prepared in the same manner as in Example 82 except that the following chemically strengthening step was carried out between the (6) second polishing step and the (7) inspection step.

In the chemically strengthening step, a chemically strengthening solution containing a mixture of potassium nitrate and sodium nitrate was provided, the chemically strengthening solution was heated to 380° C., and the above cleaned and dried glass substrates were immersed therein for approximately 4 hours for chemical strengthening. The chemically strengthened glass substrates were consecutively immersed in washing vessels of neutral detergent, pure water, pure water, IPA and IPA (vapor drying) to carry out ultrasonic cleaning, and dried.

A 0.4 mm thick thin piece was cut from each of the obtained glass substrates and measured through a polarizing microscope, to show that chemically strengthened layers were formed. The glass substrates in this Example did not undergo any fracture during the above polishing steps and during handlings thereof between one step and another step.

The thus-obtained magnetic disks were tested for a touch down height, to show an excellent value of 5 nm. Further, the magnetic disks were subjected to a load-and-load test (100,000 times) to show that no head clashed.

The glass substrate for an information recording medium, provided by the present invention, is excellent in scratch resistance and light in weight, and has high resistance to progress of fractures or has high fracture toughness. As compared with any conventional glass substrate for an information recording medium, the glass substrate of the present invention can serve to greatly decrease a breakage during the production of magnetic disks and during the use of an information recording medium. Further, since a glass for a glass substrate can be produced at a cost equivalent to the cost required for commercially available glass substrates or at a low cost, the glass is promising as a less-expensive next-generation glass substrate for a magnetic information recording medium.

The invention claimed is:

1. A magnetic information recording medium comprising a magnetic recording layer formed on a glass substrate for an information recording medium, said glass substrate comprising, by mol %, 40 to 74.5% of $SiO_2$, 7.5 to 15% of $Al_2O_3$, 1% or more MgO as RO, 0 to 25% of $B_2O_3$, the total content of $Al_2O_3$ and $B_2O_3$ being 7.5% or more, 1 to 12% of total RO in which R is at least one member selected from the group consisting of Mg, Ca, Zn, Sr and Ba, wherein MgO is an essential component and CaO, ZnO, SrO and BaO are optional components, 17 to 25% of total $R'_2O$ in which R' is Li, Na and K, 0 to 7% of $TiO_2$ and 0 to 7% of $ZrO_2$, the glass substrate containing 10 to 18% of $Li_2O$, 1 to 10% of $Na_2O$ and 2 to 8% of $K_2O$ as $R'_2O$, the total content of $SiO_2$, $Al_2O_3$, $B_2O_3$, RO and $R'_2O$ being 90% or more, the total content of RO and $R'_2O$ being 18 to 29%.

2. The magnetic information recording medium of claim 1, wherein the glass substrate has a fragility index value, measured in an atmosphere having a dew point of −5° C. or lower, of 7 $\mu m^{-1/2}$ or less.

3. The magnetic information recording medium of claim 1, wherein the glass substrate has a Young's modulus of at least 70 GPa.

4. The magnetic information recording medium of claim 1, wherein the glass substrate has a modulus of rigidity of at least 20 GPa.

5. The magnetic information recording medium of claim 1, wherein the glass substrate is made of a glass having a region wherein the glass has a viscosity of at least 1 Pa·s, in a range of temperatures equivalent to, and higher than, a liquidus temperature of the glass.

6. The magnetic information recording medium of claim 1, wherein the glass substrate is made of a glass having a thermal expansion coefficient of $60\times10^{-7}$/° C. or greater at a temperature of 100° C. to 300° C.

7. The magnetic information recording medium of claim 1, wherein the glass substrate has no chemically strengthened layer.

8. The magnetic information recording medium of claim 1, wherein the glass substrate has a chemically strengthened layer.

9. The magnetic information recording medium of claim 1, wherein said glass substrate contains 5 mol % or more of RO.

10. The magnetic information recording medium of claim 9, wherein said glass substrate contains 1 to 5 mol % of $Na_2O$.

11. The magnetic information recording medium of claim 10, wherein said glass substrate contains 60 to 74.5 mol % of $SiO_2$.

* * * * *